United States Patent [19]
Komori et al.

[11] 4,395,118
[45] Jul. 26, 1983

[54] COPYING APPARATUS

[75] Inventors: Shigehiro Komori; Masaru Yamaguchi, both of Yokohama, Japan

[73] Assignee: Canon Kabushiki Kaisha, Tokyo, Japan

[21] Appl. No.: 347,784

[22] Filed: Feb. 11, 1982

Related U.S. Application Data

[63] Continuation of Ser. No. 46,627, Jun. 8, 1979, abandoned, which is a continuation of Ser. No. 748,396, Dec. 7, 1976, abandoned, which is a continuation of Ser. No. 556,201, Mar. 7, 1975, abandoned.

[30] Foreign Application Priority Data

Mar. 12, 1974 [JP] Japan ................................. 49-28361

[51] Int. Cl.³ ............................................. G03B 27/62
[52] U.S. Cl. ......................................... 355/75; 355/8; 355/25
[58] Field of Search .................... 355/8, 11, 75, 50, 51, 355/3 R, 76, 23–25

[56] References Cited

U.S. PATENT DOCUMENTS

| | | | |
|---|---|---|---|
| 3,493,299 | 2/1970 | Hazelton, Jr. | 355/11 |
| 3,685,905 | 8/1972 | Marshall et al. | 355/8 |
| 3,762,813 | 10/1973 | Fowlie et al. | 355/11 |
| 3,804,512 | 4/1974 | Komori et al. | 355/8 |
| 3,833,296 | 9/1974 | Vola et al. | 355/8 |
| 3,900,258 | 8/1975 | Hoppner et al. | 355/8 |

*Primary Examiner*—G. Z. Rubinson
*Assistant Examiner*—W. J. Brady
*Attorney, Agent, or Firm*—Fitzpatrick, Cella, Harper & Scinto

[57] ABSTRACT

In a copying apparatus having an original-supporting surface capable of supporting thereon a thick original and a sheet-original exposure and transport portion, the original-supporting surface and the exposure surface of the sheet-original exposure and transport portion are formed separately and independently of each other or formed integrally with each other. The apparatus further includes an optical system for directing the image of an original to a photosensitive medium, and various copying process means. When an original on the original-supporting surface is to be copied, the optical system scans the original while moving along the original-supporting surface. When a sheet original is to be copied, the optical system is fixed to correspond to the exposure surface spaced apart from the original-supporting surface and the sheet original is passed through the sheet-original transport portion for scanning.

2 Claims, 38 Drawing Figures

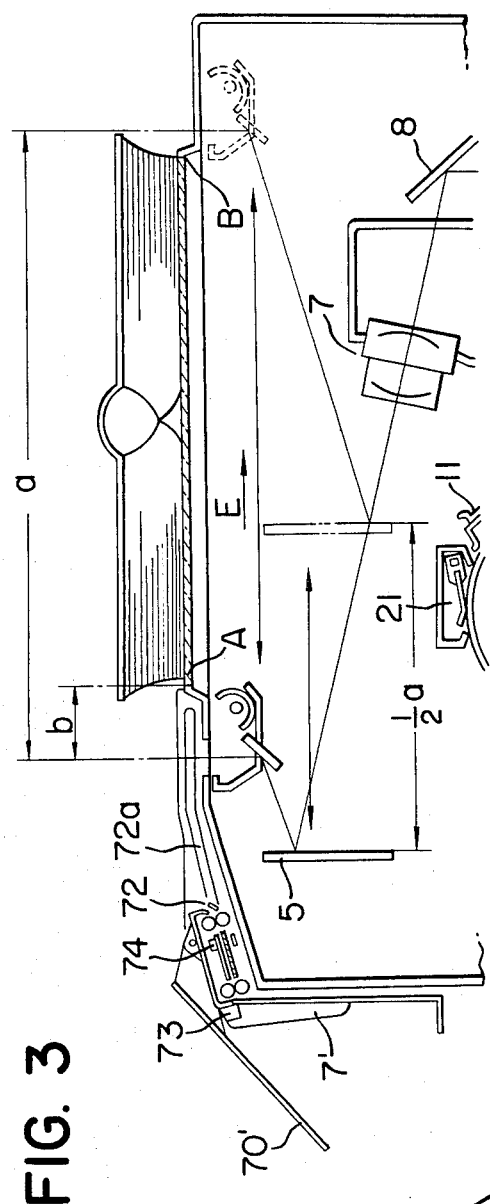
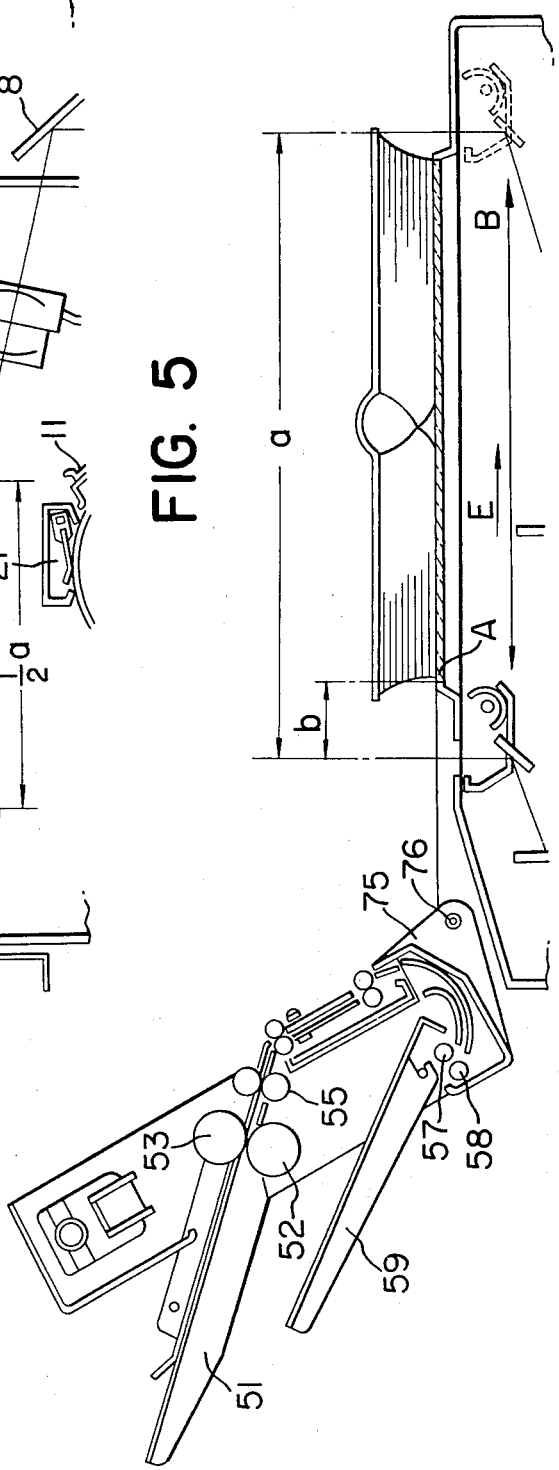
FIG. 3
FIG. 5

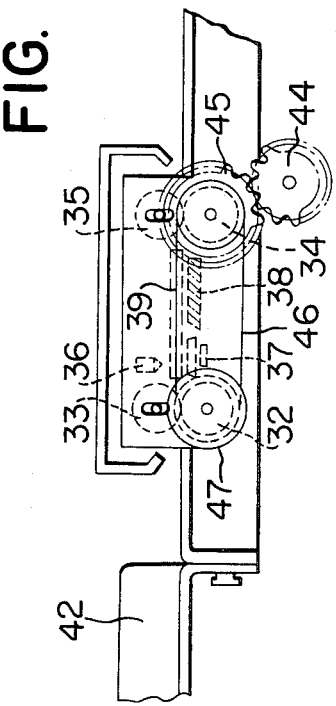
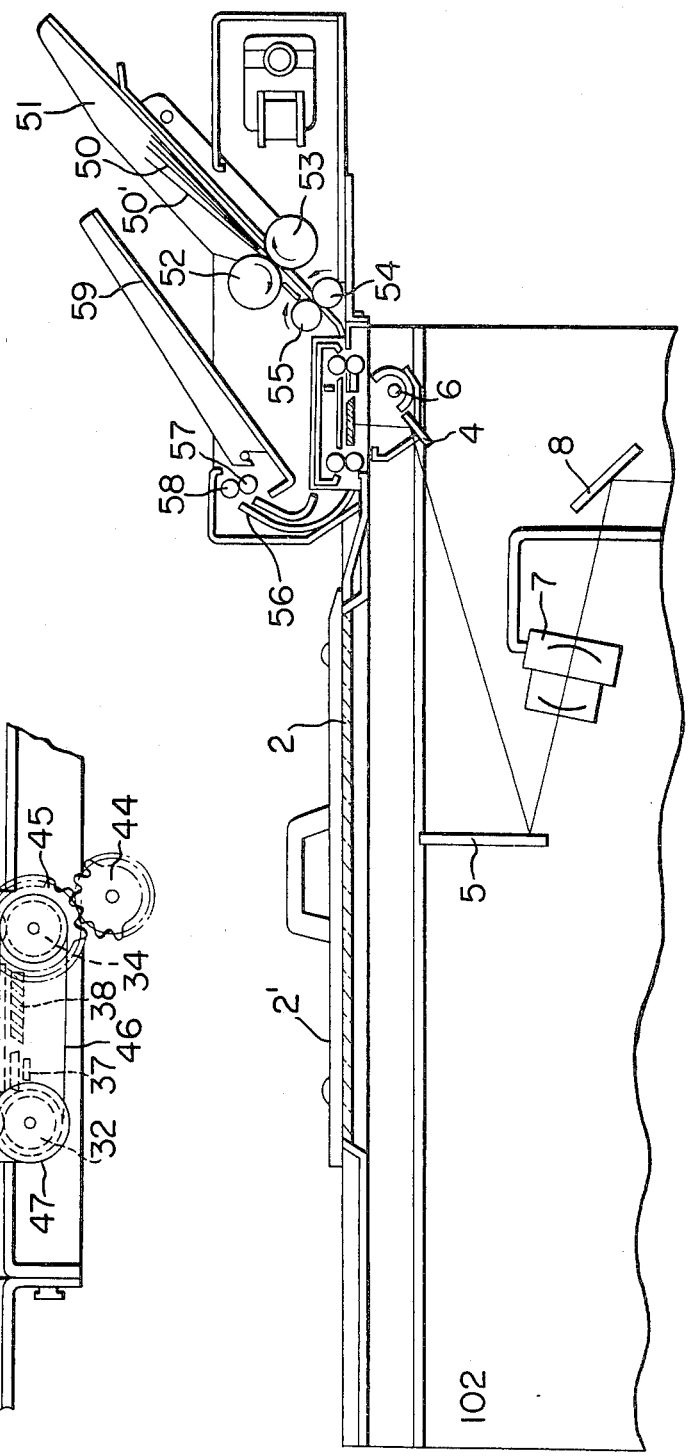
FIG. 8
FIG. 9

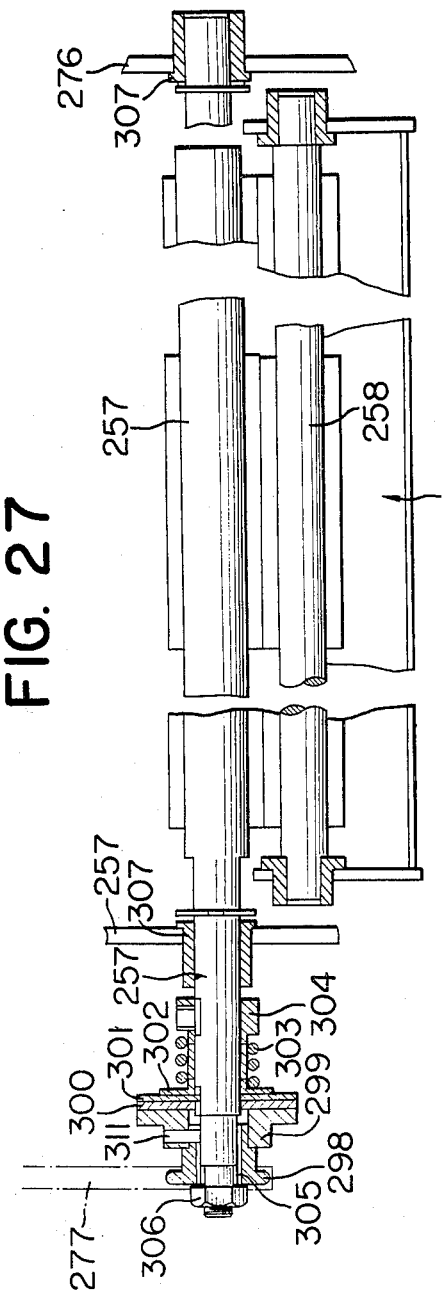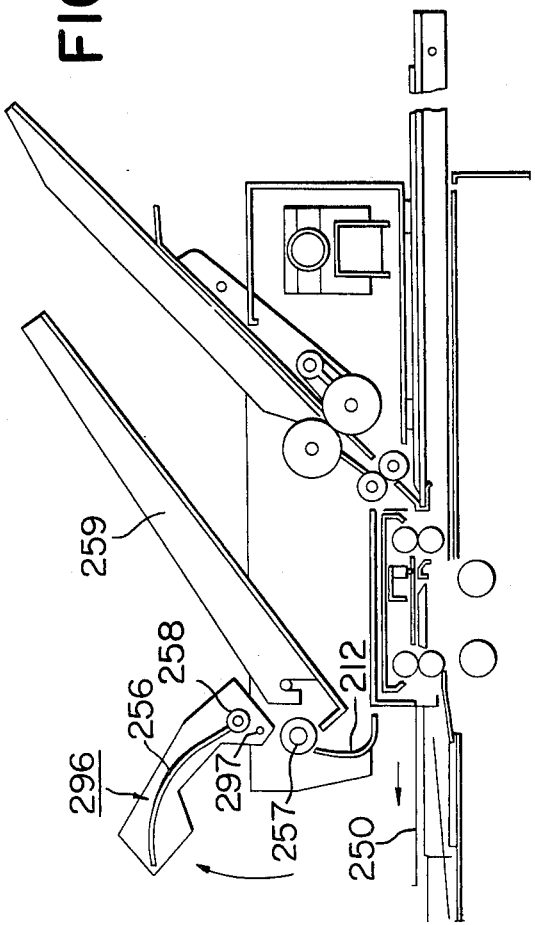
FIG. 27
FIG. 28

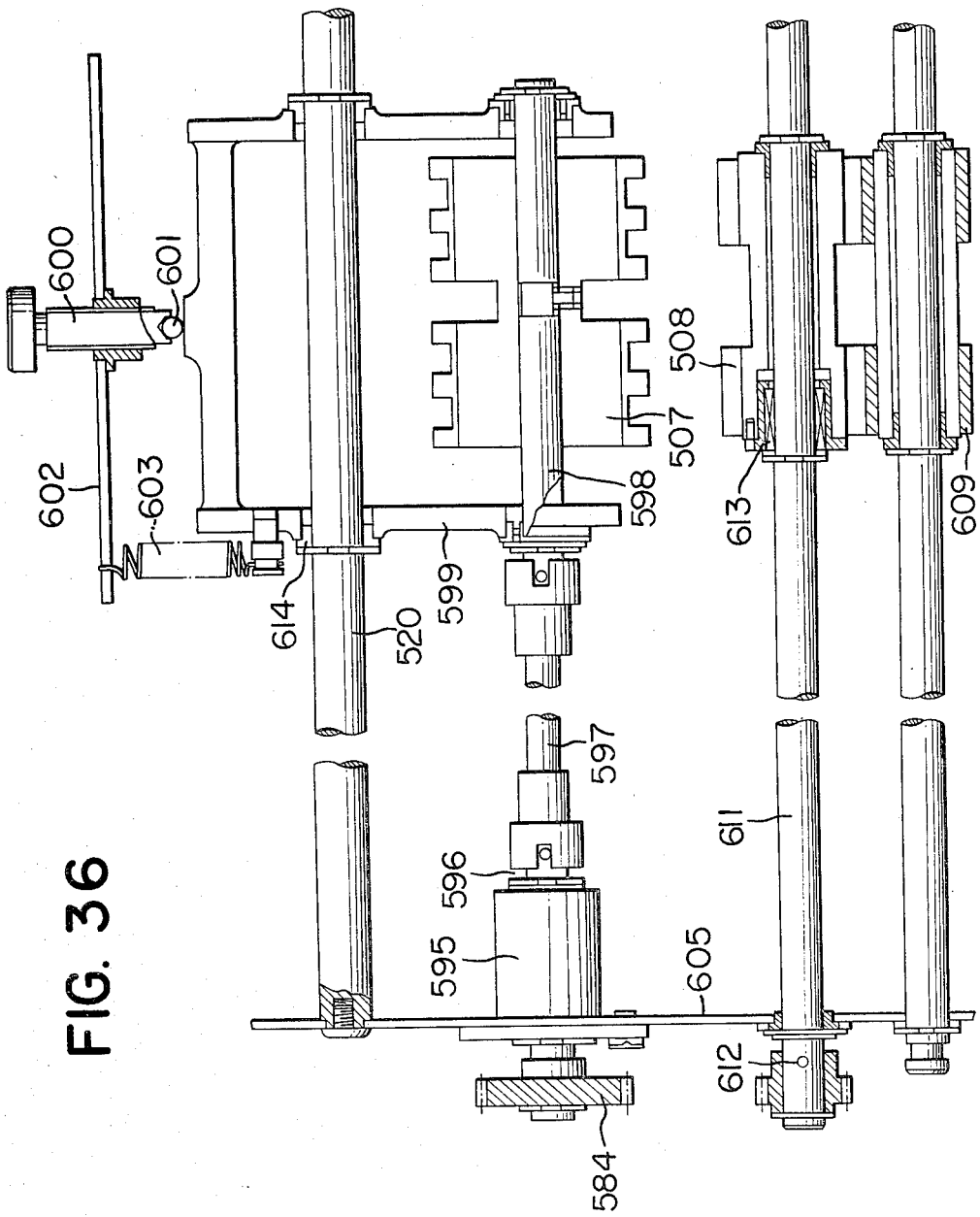

COPYING APPARATUS

This is a continuation of application Ser. No. 46,627, filed June 8, 1979, now abandoned, which in turn is a continuation of U.S. Ser. No. 748,396, filed Dec. 7, 1976, now abandoned, which in turn is a continuation of U.S. Ser. No. 556,201, filed Mar. 7, 1975, now abandoned.

BACKGROUND OF THE INVENTION

1. Field of the Invention

This invention relates to a useful copying apparatus which can fully function both as sheet-original copying apparatus and thick-original copying apparatus and also conveniently permits use of a sheet-original autofeeder and which incorporates various devices enhancing the convenience in use.

2. Description of the Prior Art

Copying machines have heretofore been generally grouped into two types, i.e. those exclusively used for copying of sheet originals and those which can copy three-dimensional originals such as books and the like.

The sheet-original copying machines cannot copy books or other thick originals, but they can produce copies of sheet originals if only the sheet originals are fed into an inlet port. Also, for the same process, the sheet-original copying machines need no backward stroke of the original carriage or the optical system and can correspondingly increase the copying speed (to about twice).

In addition, they are simple in mechanical construction and accordingly low in price. They can also be readily equipped with autofeeders.

The copying machines which can copy thick originals such as books and the like have a great characteristic that they can also produce copies of sheet originals, but they are designed such that any original to be copied must be placed flatly on the original carriage and thus, when a sheet original is to be copied, the original keep cover must be opened as when a thick original is to be copied, and then the sheet original must be placed on the original carriage glass, whereafter the cover must be closed and the copy button must be depressed to effect copying.

Further, the presence of backward stroke of the original carriage or the optical system leads to a corresponding loss of time and the copying speed is necessarily decreased for the same process. Moreover, such machines are complicated in mechanical construction and accordingly expensive. Furthermore, these machines will encounter great difficulties if they are to be equipped with autofeeders.

SUMMARY OF THE INVENTION

It is an object of the present invention to provide a copying apparatus which can copy both sheet originals and thick originals.

It is another object of the present invention to provide a copying apparatus in which an optical system is movable to scan an original on an original-supporting surface.

It is still another object of the present invention to provide a copying apparatus in which the optical system is moved to thereby scan an original on the original-supporting surface but the optical system is stationary when sheet originals are transported for exposure.

It is yet another object of the present invention to provide a copying apparatus in which the original-supporting surface and the sheet-original exposure and transport portion are disposed independently of each other and perform their functions independently.

It is a further object of the present invention to provide a copying apparatus in which the original-supporting surface and the sheet-original exposure and transport portion are integral with each other.

It is a further object of the present invention to provide a copying apparatus in which the sheet-original exposure and transport portion is disposed at the exposure scanning starting end of the optical system with respect to the thick-original supporting surface.

It is a further object of the present invention to provide a copying apparatus in which the sheet-original exposure and transport portion and the thick-original supporting surface are fixed to the original carriage.

It is a further object of the pesent invention to provide a copying apparatus in which the sheet-original exposure and transport portion is disposed at the exposure scanning terminating end of the optical system with respect to the thick-original supporting surface.

It is a further object of the present invention to provide a copying apparatus in which the original carriage may be displaced to thereby effect the change-over between sheet-original copying and thick-original copying.

It is a further object of the present invention to provide a copying apparatus in which sheet originals can be automatically fed.

It is a further object of the present invention to provide a copying apparatus which can copy both sheet originals and thick originals and in which sheet originals can be automatically fed one by one.

It is a further object of the present invention to provide a copying apparatus in which a sheet-original autofeeder is rotatable for release.

It is a further object of the present invention to provide a copying apparatus in which the autofeeder may be released to thereby enable copying of thick originals.

It is a further object of the present invention to provide a copying apparatus in which the sheet-original carriage of the autofeeder is removable.

It is a further object of the present invention to provide a copying apparatus in which the sheet-original carriage is removable to thereby enable copying of thick originals.

It is a further object of the present invention to provide a copying apparatus which is also capable of both-side copying.

A feature of the present invention is that, in a copying apparatus of the type wherein the original carriage is stationary or the optical system is movable, the original-supporting surface and the sheet-original exposure and transport portion are formed integrally with each other so that, in case of sheet-original copying, the illuminating portion is fixed on an extension of its scanning path to thereby accomplish copying of sheet originals, thus simply effecting the change-over between thick-original copying function and sheet-original copying function.

More specifically, in a first embodiment, the sheet-original exposure and transport portion is disposed at the starting point of the exposure scanning of the optical system to provide for the sheet-original copying function. Usually, in a movable mirror type exposure device wherein two groups of mirrors are moved at a velocity ratio of 2:1, as shown in FIG. 1 of the accompanying drawings, the entire stroke thereof consists of the following factors:

> Entire stroke $(a)$ = Initial running range $(b)$ + Exposure range $(d)$ (maximum available size of original + width of exposure slit) + Overrun range $(c)$ The size of a copying machine often depends on the entire stroke of the optical system and in making it compact, how to reduce the amount of movement outside the exposure range is a matter of consideration.

The aforementioned initial running range is an acceleration range or a shock absorbing range for exposure to be effected at a predetermined speed from stationary position, and is indispensable to minimize mechanical abrasion and fatigue from shock (especially, deterioration of illuminating lamp) to thereby increase the durability of the apparatus as well as to provide proper and satisfactory image formation. That is, vibrations of mirrors, reflectors, etc. resulting from sudden change in speed must be completely eliminated prior to the exposure range. Otherwise, such vibration would result in synchronous blur in the forward end of image which would prevent satisfactory copying from being achieved.

Accordingly, as the scanning speed is increased, the initial running range must more indispensably be longer.

On the other hand, the overrun range (c) is a range for absorbing any shock occurring at the terminating end of the exposure scanning during a predetermined speed movement, stoppage and reversal, and may simple be regarded as serving to prevent mechanical abrasion or the like.

Thus, the initial running range (b) must usually be longer than the overrun range.

In view of the necessity of such indispensable initial running range, the present invention is featurized in that the starting end of the exposure scanning (starting point) is made to directly serve the purpose of sheet-original copying by successfully utilizing the fact that the starting point of the illuminating portion (stop position) is spaced apart from the exposure range.

In the machines heretofore devised, during sheet-original copying, the exposure range for sheet original has been provided by using some or other means to move the mirror system from its starting point to a position within the exposure range or by unnecessarily enlarging the thick-original supporting surface. However, utilization of part of the thick-original supporting surface and transportation of sheet original thereon at a synchronous speed presupposes the provision of complicated mechanisms using belts or the like and moreover, these mechanisms would have to be retracted during thick-original copying.

According to the present invention, the stop position of the optical system (starting point) directly corresponds to the sheet-original exposure and transport portion and this eliminates the waiting time for the above-described movement and also eliminates the need to provide the complicated mechanisms for sheet-original transport each time sheet-original copying is desired.

Further, since sheet-original exposure occurs in a portion spaced apart from the exposure range (d), the sheet-original exposure surface may be entirely separate from the thick-original supporting surface so that transport means exclusively used for sheet originals can well be disposed, thereby providing a very stable function of short-original transport.

In a second embodiment of the present invention, the sheet-orignal transport portion is disposed at the terminating end of the exposure scanning movement of the optical system. Therefore, exposure for sheet originals may occur with the optical system moved and fixed to the sheet-original transport portion. This is particularly useful when an autofeeder for automatically feeding sheet originals is used with the copying apparatus.

If the sheet-original exposure and transport portion was located at the left-hand side of the thick-original supporting surface, the separating and feeding portion would just overlie the original-supporting surface and the autofeeder would have to be removed each time the change-over operation is to be effected.

Thus, in order that even the sheet-original exposure and transport portion disposed at the right-hand side of the thick-original supporting surface may be utilized effectively, it is important that the two do not positionally interfere with each other so that they can perform their functions independently of each other.

Further effectiveness will be provided for by maintaining a suitable spacing between the two and providing guide means deflectable so as to prevent a sheet original discharged from the sheet-original exposure and transport portion from striking against the original keep plate.

In a third embodiment of the present invention, the original supporting surface and the sheet-original exposure and transport portion of the copying apparatus of the stationary original carriage type or the movable optical system type are formed integrally with each other and the entire original carriage including the sheet-original exposure and transport portion may be moved over a predetermined distance to effect the change-over between the two functions.

According to such method, the length of the scanning path of the optical system may be shortened as compared with the apparatus of the type in which the entire original carriage including the sheet-original exposure and transport portion is fixed to the main body of the apparatus and the illuminating portion is movable to just underlie the sheet-original exposure and transport portion.

Accordingly, the lens may be of shorter focal length and thus may be smaller in size, which in turn will lead to a smaller size of the entire body.

Thus, the present invention is a very excellent apparatus which permits simple change-over between the two usages and which can be realized almost on the same scale as the conventional copying machines of the stationary original carriage type and conveniently permits the use of an autofeeder.

The above objects and features of the present invention will become more fully apparent from the following detailed description taken on conjunction with the accompanying drawings.

BRIEF DESCRIPTION OF THE DRAWINGS

FIG. 3 is a fragmentary sectional view with the sheet-original transport portion of FIG. 2 released.

FIG. 5 is a fragmentary sectional view with the autofeeder released.

FIG. 8 is a cross-sectional view of the driving system for the sheet-original transport portion of the copying apparatus shown in FIG. 6.

FIG. 9 is a fragmentary sectional view of an embodiment in which a sheet-original autofeeder is disposed in the sheet-original transport portion of the copying apparatus shown in FIG. 6.

FIG. 14-b is a time chart of the output from a detector for detecting the rotational position of the photosensitive drum.

FIG. 14-c is a block diagram of a control circuit for the change-over between thick-original copying and sheet-original copying.

FIG. 27 is a sectional view of the discharge rollers in the driving system.

FIG. 28 is a sectional view of the autofeeder as it is used with a second guide thereof opened.

FIG. 36 is a sectional view of the separating roller and drawing rollers with their driving system.

DESCRIPTION OF THE PREFERRED EMBODIMENTS

Figure 1:
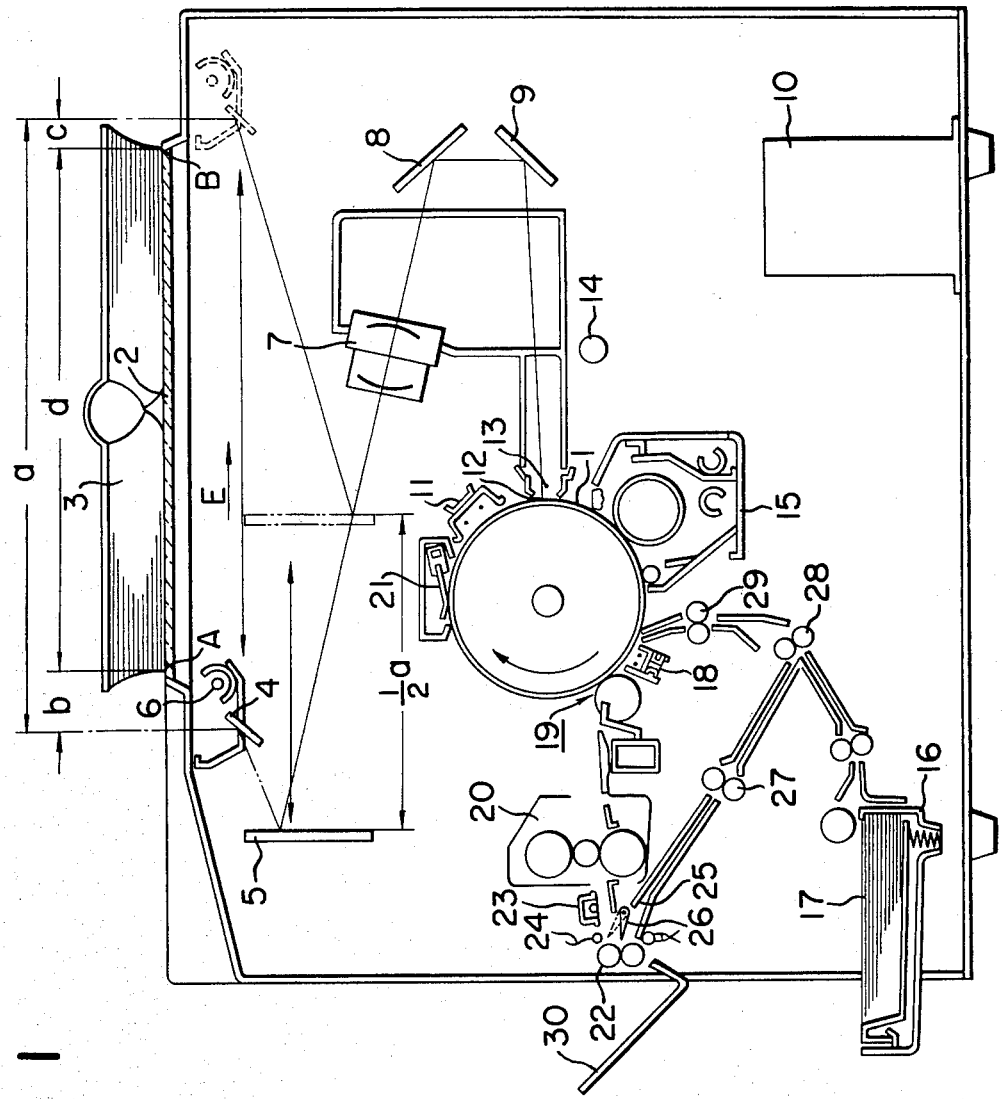
FIG. 1 is a longitudinal cross-section schematically showing a conventional copying apparatus to which the present invention is applicable.

With reference to FIGS. 1 to 5, operation of the copying apparatus according to a first embodiment of the present invention will be described. First, an example of the copying apparatus to which the present invention is applicable will be explained. An original carriage glass 2 forming an original-supporting surface supports thereon an original 3, and the original 3 is held down by an original keep plate 2′. An optical system includes an illuminating portion comprising an illuminating lamp 6 and a movable mirror 4, a movable mirror 5, a lens 7 and stationary mirrors 8 and 9. Thus, the original 3 is scanned by the movable mirror 4 moved with the illuminating lamp 6 and the movable mirror 5 moved at half the velocity of the movable mirror 4, with the length of the optical path maintained constant by these movable mirrors, and the image of the original is directed via the lens 7 and the stationary mirrors 8,9 and focused on a drum 1 through slit-exposure. That is, the original 3 undergoes slit-exposure while being scanned by the optical system (illuminating portion).

The surface of the drum 1 has a photosensitive medium comprising a photosensitive layer covered with a transparent insulating layer, and the photosensitive medium is first charged with positive polarity by a positive charger 11 supplied with a positive high voltage from a high voltage source 10. Subsequently, when the photosensitive medium reaches an exposure portion 12, the original 3 on the carriage glass 2 is illuminated by the illuminating lamp 6 and the image thereof is focused on the drum 1 via the movable mirrors 4,5, and lens 7 and the stationary mirrors 8,9 and thus, the photosensitive medium is exposed to the image of the original while, at the same time, it is subjected to AC discharge by an AC discharger 13 supplied with a high AC voltage from the high voltage source 10.

The drum surface is then subjected to allover exposure by an allover exposure lamp 14 to form an electrostatic latent image thereon (i.e. on the photosensitive medium), whereafter the drum enters a developing device 15.

Development is effected by the sleeve type toner developing method, whereby the electrostatic latent image is developed into a visible image.

Next, a copy medium 17 fed from a cassette 16 containing therein a supply of copy mediums is brought into intimate contact with the drum 1 and charged by a transfer charger 18 supplied with a high voltage from the high voltage source 10, so that the image on the drum 1 is transferred onto the copy medium 17.

After the image transfer, the copy medium is separated from the drum 1 by a separator portion 19 using a separator belt or the like, and directed to a fixing portion 20 for fixation, whereafter any excess charges on the copy medium are removed by a deelectrifier 23 and the copy medium is discharged through discharge rollers 22 into a tray 30. In case of ordinary copying (one-side copying), this completes a copy cycle and in the meantime, the drum surface (photosensitive medium) is cleaned by a blade 21 urged thereagainst to remove any residual toner, thus becoming ready for another copying cycle.

Further, the present embodiment enables copying to be simply and readily effected on both sides of copy medium. More specifically, after copying has been completed on the surface of copy medium (this corresponds to the ordinary copying), the copy paper is not discharged out of the apparatus but may be again directed to the transfer device for back-side copying.

In the first copy cycle, the copy paper is passed through the fixing device 20 and transported through the discharge rollers 22 as it is deelectrified by the deelectrifier 23, and the passage of the trailing end of the copy paper through the discharge rollers is detected by a light-sensing element 24, whereupon the discharge rollers 22 are reversed in rotation to direct the copy medium into a passage 25 for backside copying. Simultaneously with the reversal of the discharge rollers 22, a guide plate 26 is displaced to a position for guiding the copy paper into the passage 25, and the copy paper is stopped by transport rollers 27 and 28 near register rollers 29.

Subsequently, in a second copy cycle, back-side copying is entered and the copy paper is again fed into the transfer device by a paper feed signal and under the control of the register rollers 29, and after the image transfer has been done, the copy paper is passed through the fixing device 20 and the deelectrifier 23 and discharged through the discharge rollers 22 into the tray 30.

For simplicity, the driving system and the sequence of various processes will particularly be described in connection with circuit. The arrangement of various process means disposed around a drum-shaped photosensitive medium, a paper feed driving system for effecting paper feed in synchronism with the optical system, and the method of driving the illuminating portion and the mirror 5 at a velocity ratio of 2:1 have generally been in use.

A feature of the present invention is that a sheet original transport portion is provided adjacent to the starting point (or end) whereat the optical system starts its exposure scanning movement, whereby the apparatus is provided with a sheet-original copying function.

Figure 2:
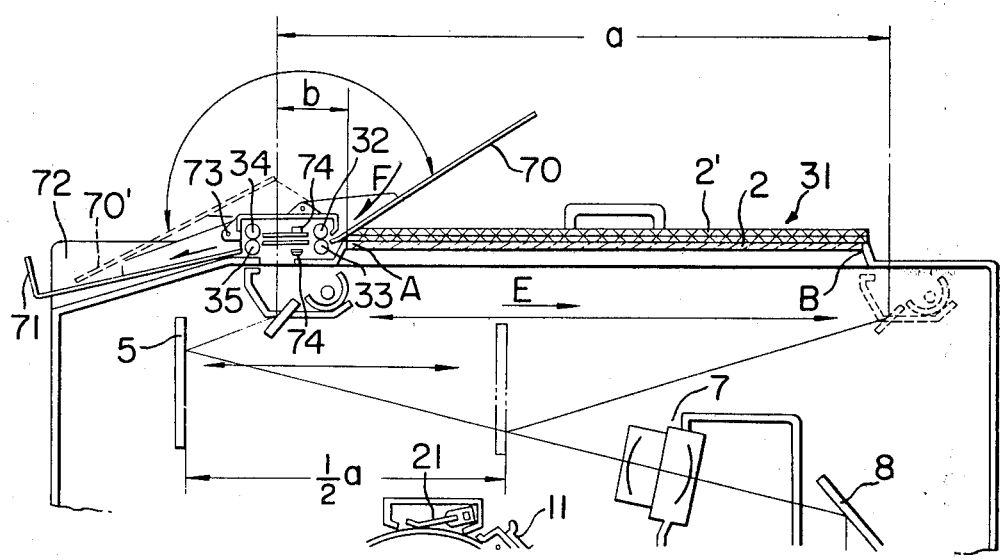
FIG. 2 is a fragmentary sectional view of a sheet-original transport portion in a first embodiment of the present invention.

The present invention will now be described with respect to an embodiment thereof. In FIG. 2, a sheet-original exposure and transport portion chiefly comprising sheet-original transport rollers 32, 33, 34, 35 is provided at the left end (starting end) of original carriage 31 which provides the original-supporting surface.

A sheet original may be fed from above an original-reception guide 70 into the nip between the rollers 32 and 33 and the leading end of the sheet original may be detected by a detector element 74 (light-sensing element, microswitch or the like), whereupon the sheet original will temporarily be stopped. When the drum 1 has been rotated to a predetermined angular position, the sheet original will again be transported between guide glass and guide plate by the rollers 32, 33, 34, 35 in synchronism with the drum 1, so that the image of the sheet original may be projected upon the drum 1, whereafter the sheet original may be discharged onto a tray 71.

The drive and control systems for the transport rollers 32, 33, 34, 35 may readily be realized in a known manner by a combination of a rotational transmission member such as gear, frictional wheel or the like, electromagnetic clutch, detector element 74 and a signal produced by rotation of the drum.

In FIG. 2, the exposure stroke in thick-original copying mode is in the direction indicated by arrow E, and transport of sheet original occurs in the direction indicated by arrow F.

Thus, according to the present invention, the sheet-original exposure and transport portion is disposed at the left-hand side of the thick-original supporting surface or at the starting point of the exposure scanning movement and therefore, the sheet-original reception guide 70 overlies the original carriage glass 2 and will form an obstacle during thick-original copying. Accordingly, as indicated by dotted line in FIG. 2, the guide 70 is designed to be readily rotatable to the position as indicated by 70'. Further, when the left corner portion of the original-supporting surface is utilized to effect copying, the guide 70 is movable to the position for thick original shown in FIG. 3. The sheet original transport unit is provided with rollers (not shown) at the opposite ends thereof, and is movable along a groove 72a in a plate 72 secured to the main body and may be locked at the opposite ends of the groove, namely, at two positions.

Figure 4:
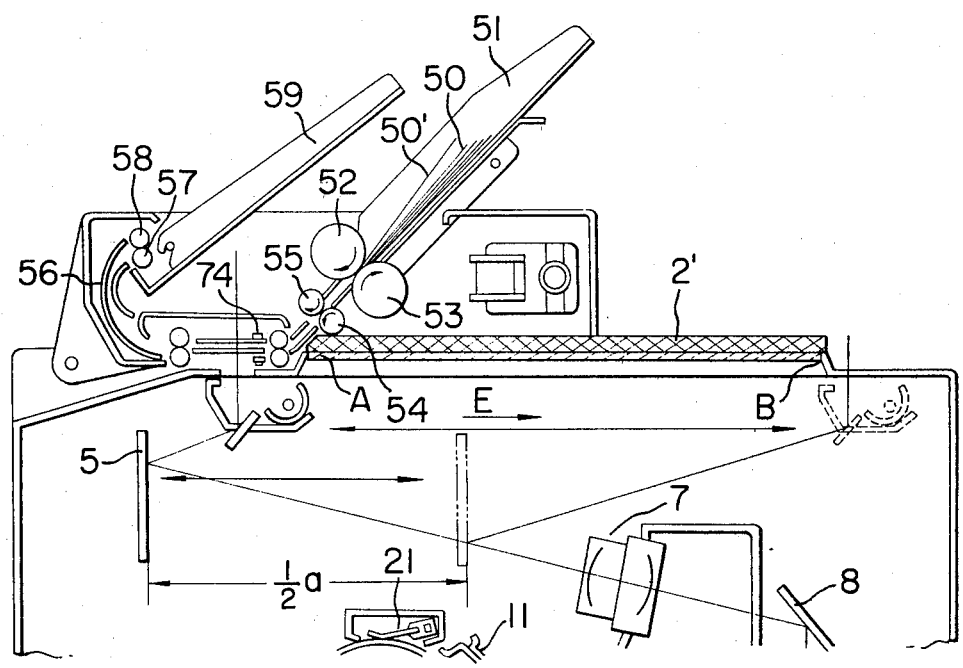
FIG. 4 is a fragmentary sectional view of an embodiment in which a sheet-original autofeeder is disposed in the sheet-original transport portion of FIG. 2.

FIG. 4 shows a case where a most common sheet-original autofeeder is disposed in the sheet-original exposure and transport portion. When a pile of sheet originals 50 is placed on a sheet-original supporting bed 51, the uppermost sheet original 50' may be separated and advanced by separating and feeding rollers 52 and 53, which are rotating in the opposite directions to feed sheet original, and fed to the sheet-original exposure and transport portion by transport rollers 54 and 55. Thereupon, the image of the fed original 50' may be focused on the drum 1 in the same manner as in the case of ordinary sheet original copying, whereafter the sheet original 50' may be delivered onto an original tray 59 with the aid of a guide 56 and delivery rollers 57 and 58.

When the autofeeder is so employed, the sheet original feed portion is disposed on the original carriage glass 2, and it must be retracted leftwardly during thick-original copying.

FIG. 5 illustrates the position in which a thick original is copied with the autofeeder released. As shown, the autofeeder unit is generally supported by an arm 75 and pivotable by a hinge portion 76.

The autofeeder unit cannot be installed in the overrun range b which is limited in space, but nevertheless, if it is desired to do so, the mirror system must be displaced excessively and spaced apart from the exposure range (the original-supporting surface) as far as required. This in turn would require the focal length of the lens in use to be greater and the total stroke of the mirror system to be excessively long. These would inadvisably lead to a larger size and complication of the apparatus.

Accordingly, the present invention provides a very excellent apparatus which enables thick-original copying and sheet-original copying to be accomplished at individual positions and which can be realized almost on the same scale as conventional copying machines without one function sacrificing the other function and conveniently permits an autofeeder to be used with it.

With reference to FIGS. 6 to 10, description will now be made of a second embodiment of the present invention. Operation of the copying apparatus to which this embodiment is applied is similar to that of the first embodiment.

A feature of the present invention is that, in the copying apparatus of the type wherein the original carriage is stationary or the optical system is movable, the original-supporting surface and the sheet-original exposure and transport portion are formed integrally with each other so that, in case of sheet-original copying, the illuminating portion is fixed on an extension of its scanning path to thereby accomplish copying of sheet originals, thus simply effecting the change-over between thick-original copying function and sheet-original copying function.

Figure 6:
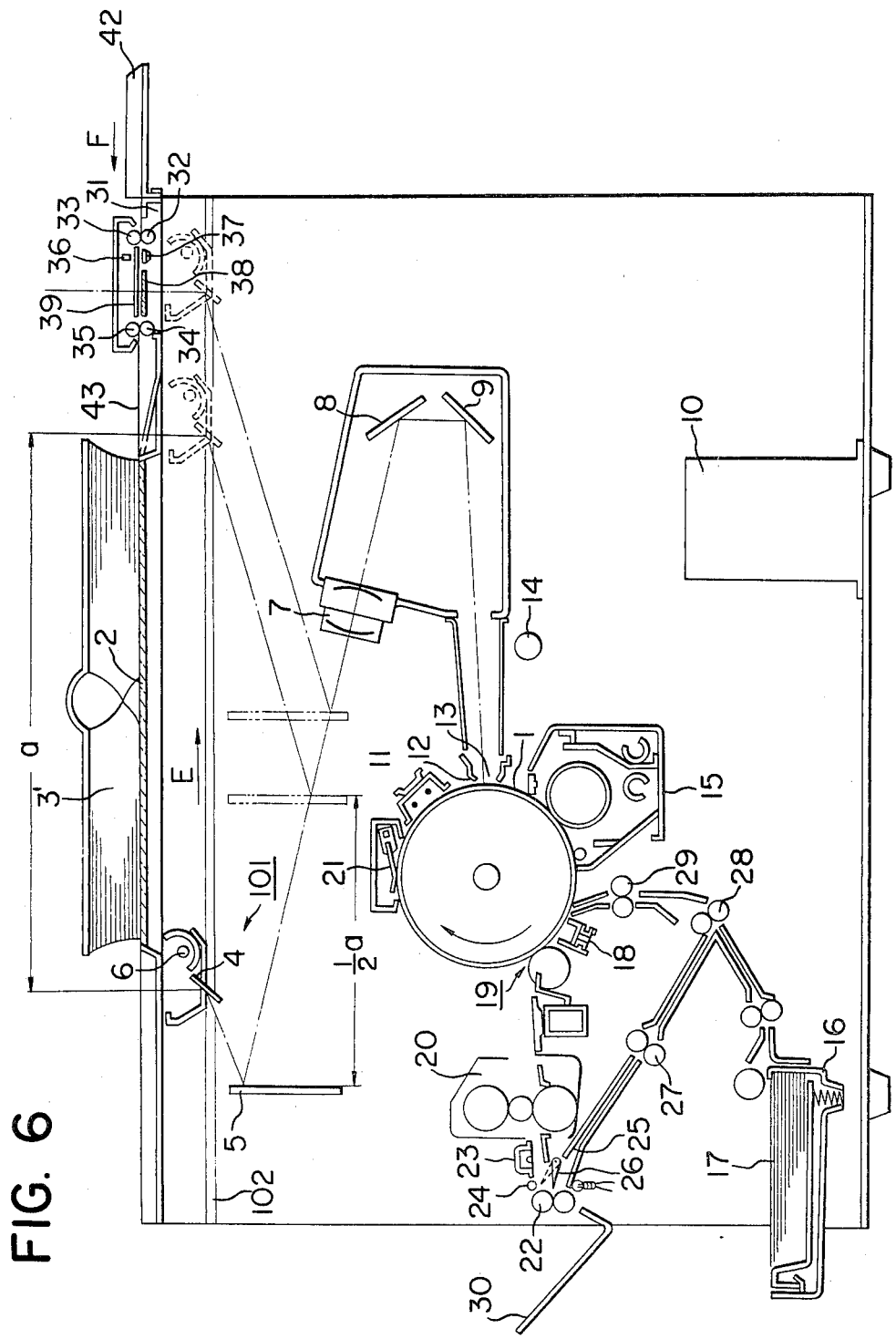
FIG. 6 is a longitudinal cross-section schematically showing a second embodiment of the present invention.

In FIG. 6, a sheet original transport portion chiefly comprising sheet original transport rollers 32, 33, 34, 35 and guide glass 38 and guide plate 39 is provided at the right end and as shown in FIG. 6, an illuminating portion 101 is displaced beyond the movement range a over which it scans the thick-original supporting surface for thick-original copying, and then fixed at a position 101 on the extension of the movement path corresponding to the sheet-original exposure and transport portion. Scanning guide rails 102 for guiding the illuminating portion 101 are disposed forwardly and backwardly of the main body of the apparatus. One of these guide rails is fitted to a slide bearing secured to the illuminating portion 101 while the other guide rail supports a roller. The scanning guide rails are further extended to guide the illuminating portion 101 beyond its movement range a.

A sheet original may be fed from above an original-reception guide 42 into the nip between the rollers 32 and 33 and the leading end of the sheet original may be detected by a lamp 36 and a light-sensing element 37, whereupon the sheet original will temporarily be stopped. When the drum 1 has been rotated to a predetermined angular position, the sheet original will again be transported between the guide glass 38 and the guide plate 39 by the rollers 32, 33, 34, 35 in synchronism with the drum 1, so that the image of the sheet original may be focused upon the drum 1, whereafter the sheet original may be discharged onto an original tray 43. A sheet original driving gear 44 is in meshing engagement with a gear 45 mounted on the transport roller 34, so that the transport roller 34 is driven and the transport roller 32 is driven through a belt or chain 46 and an electromagnetic clutch 47. The electromagnetic clutch 47 is controlled by a signal produced from the light-sensing element 37 and from rotation of the drum (FIG. 8).

In FIG. 6, the exposure stroke in thick-original copying mode is in the direction indicated by arrow E, and transport of sheet original occurs in the direction indicated by arrow F.

In FIG. 6, the sheet original exposure and transport portion is shown to be disposed at the right-hand side of the thick-original carriage glass or at the terminating end of the exposure stroke, but it may also be disposed at the left-hand side. For the following reason, however, the sheet original exposure and transport portion should desirably be disposed at the right-hand side.

If the sheet-original exposure and transport portion was disposed at the left-hand side, it would form an obstacle in placing a thick original 3' in the manner as shown in FIG. 5, in view of the fact that the right end of the original carriage glass provides a reference position for aligning the leading end of the original. Also, the sheet-original reception guide disposed on the original carriage glass must be removed during thick-original copying.

FIG. 9 shows a case where a most common sheet-original autofeeder is disposed in the sheet-original exposure and transport portion. When a pile of sheet originals 50 is placed on a sheet-original supporting bed 51, the uppermost sheet original 50' may be separated and advanced by separating and feeding rollers 52 and 53 which are rotating in the opposite directions to feed the sheet original, and fed to the sheet-original exposure and transport portion by transport rollers 54 and 55. Thereupon, the image of the fed sheet original 50' may be focused on the drum 1 in the same manner as in the case of ordinary sheet-original copying, whereafter the sheet original 50' may be delivered into an original tray 59 with the aid of a guide 56 and delivery rollers 57 and 58.

When the autofeeder is so employed, the sheet-original separating and feeding portion is disposed in the sheet-original reception portion and therefore, if the sheet-original exposure and transport portion was disposed at the left-hand side of the original carriage glass 2, the separation and delivery portion would just overlie the carriage glass 2 and the autofeeder would have to be removed each time the change-over operation is effected.

Thus, in order that even the sheet-original exposure and transport portion disposed at the right-hand side of the original carriage glass may be utilized effectively, it is important that the two do not positionally interfere with each other so that they can perform their functions independently of each other.

Further effectiveness will be provided for by maintaining a suitable spacing between the two and providing guide means deflectable so as to prevent a sheet original discharged from the sheet-original exposure and transport portion from striking against the original keep plate 2'.

By doing so, as shown in FIG. 9, the sheet original may be discharged onto the original tray 59 or at least onto the original keep plate 2' without the necessity of raising or removing an original keep plate 2'.

Figure 7:
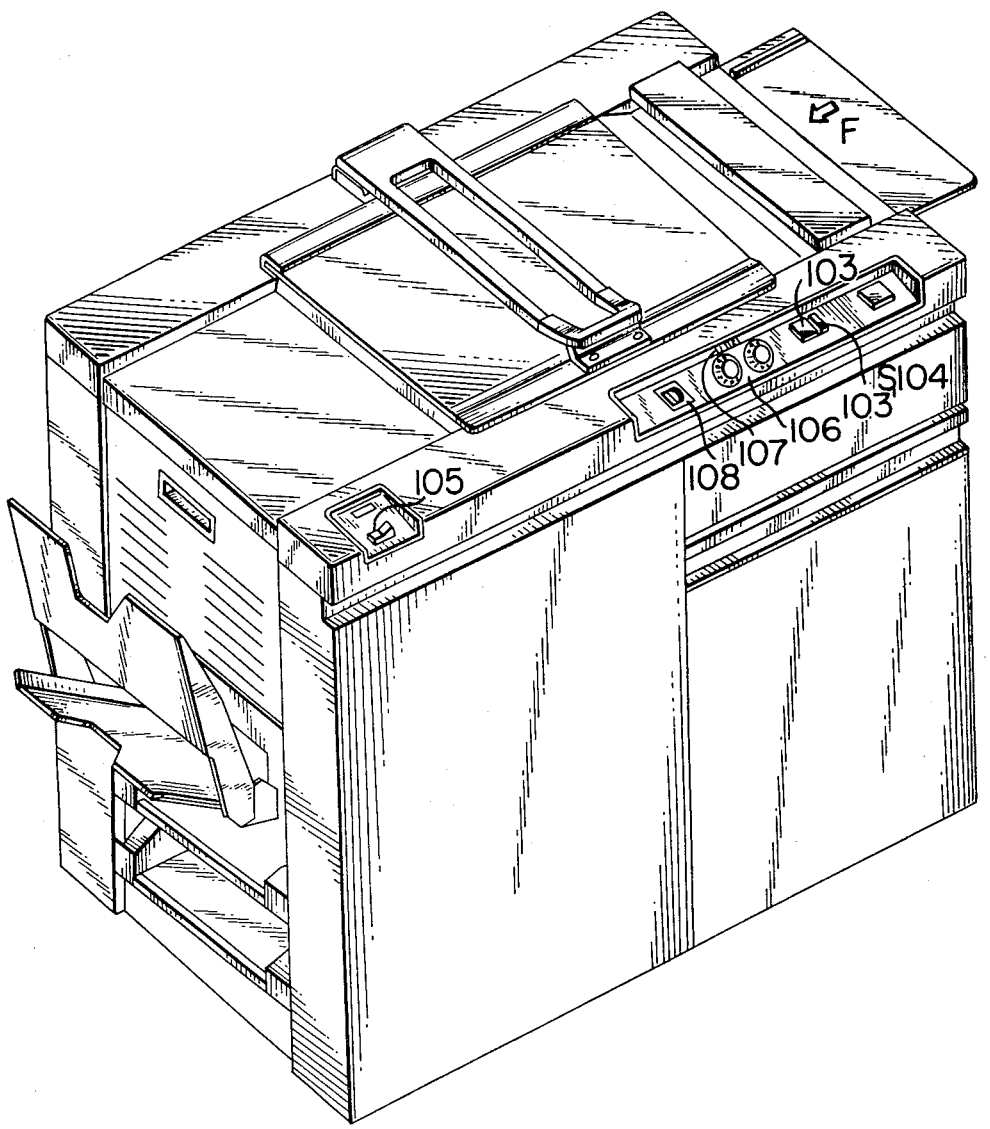
FIG. 7 is a perspective view corresponding to FIG. 6.
Figure 10:
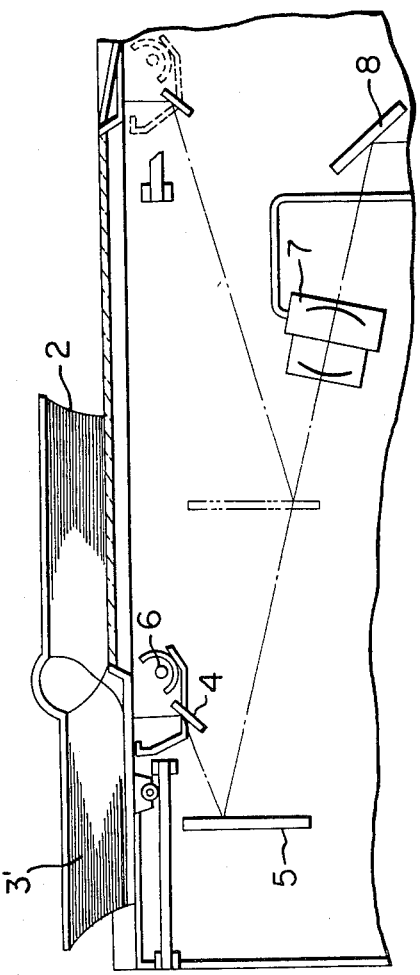
FIG. 10 is a cross-sectional view for illustrating the optical system during thick-original copying mode of the FIG. 6 copying apparatus.

A feature of the present invention is that change-over can be simply effected between the two usages based on the two functions. Therefore, there are buttons, i.e. copy buttons B 103,103' for thick-original copying and copy button S 104 for sheet-original copying. Depression of the copy buttons B 103,103' will cause the illuminating portion 101 to scan the original-supporting surface and depression of the copy button S 104 will cause the illuminating portion 101 to be fixed at a position corresponding to the sheet-original exposure and transport portion and start the sheet-original transport rollers 32–35. It will be apparent that the various processes and mechanisms are operated in accordance with the sequence corresponding to the respective cases (FIG. 7).

Numeral 105 designates a main switch for rendering the copying apparatus operative. Numeral 106 denotes a copy number set dial which is capable of setting the number of copies to 1 to 99 sheets when its scale is registered to an index mark. Designated by 107 is a copy number display tube for displaying the number of copies being produced from time to time. Numeral 103 denotes a copy start button usable for production of a plurality of copies. When only a single sheet of copy is desired, another copy start button 103' may be depressed, whereby only a single sheet of copy may be produced irrespective of the indication on the copy number set dial 106. Numeral 108 denotes a density selector dial for determining the density of copy image.

Should it be urgently desired to produce a copy of a sheet original when the apparatus is effecting production of numerous copies of a thick original, the copying of the thick original must be interrupted but the thick original itself need not be removed from the original-supporting surface and the sheet-original copy button S 104 may simply be depressed and the desired sheet original may be inserted into the apparatus.

This has become possible because the original-supporting surface and the sheet-original exposure and transport portion do not positionally interfere with each other, as noted previously.

The present invention is an advanced form of the stationary original carriage type copying apparatus which is convenient for copying of thick originals, and more specifically provides a very excellent copying apparatus which can conveniently perform sheet-original copying as well and which permit simple change-over between the two usages and also permits employment of an autofeeder.

The copying apparatus according to a third embodiment of the present invention will now be described with reference to FIGS. 11 to 13. Description will be omitted of the operations similar to those described in connection with the previous embodiments.

A feature of the present embodiment is that, in the copying apparatus of the type wherein the original carriage is stationary or the optical system is movable, the original-supporting surface and the sheet-original transport portion are formed integrally with each other so that the entire original carriage including the sheet-original transport portion is moved over a predetermined distance to thereby accomplish change-over between the two functions.

Figure 12:
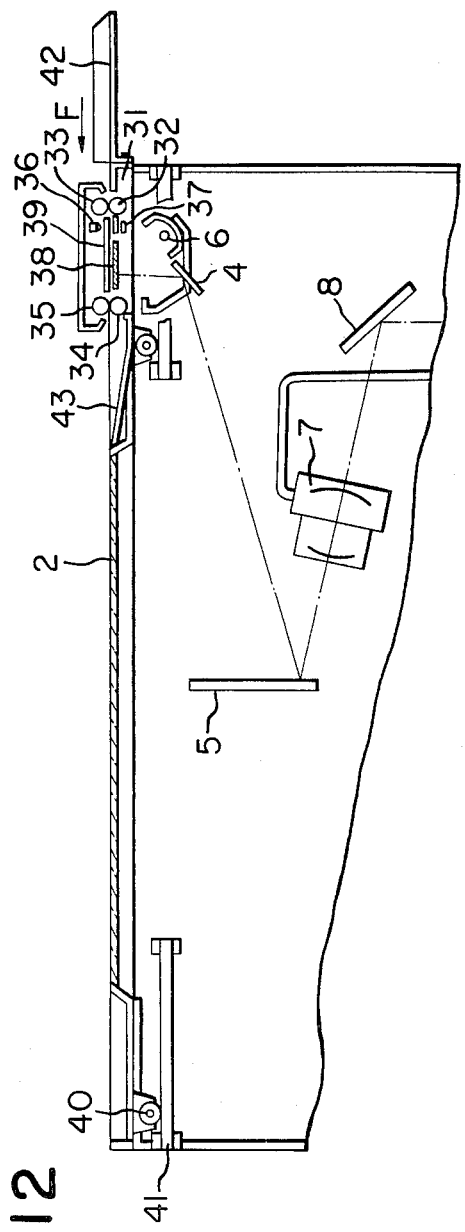
FIG. 12 is a fragmentary sectional view for illustrating the sheet-original transport portion of the FIG. 11 copying apparatus.
Figure 11:
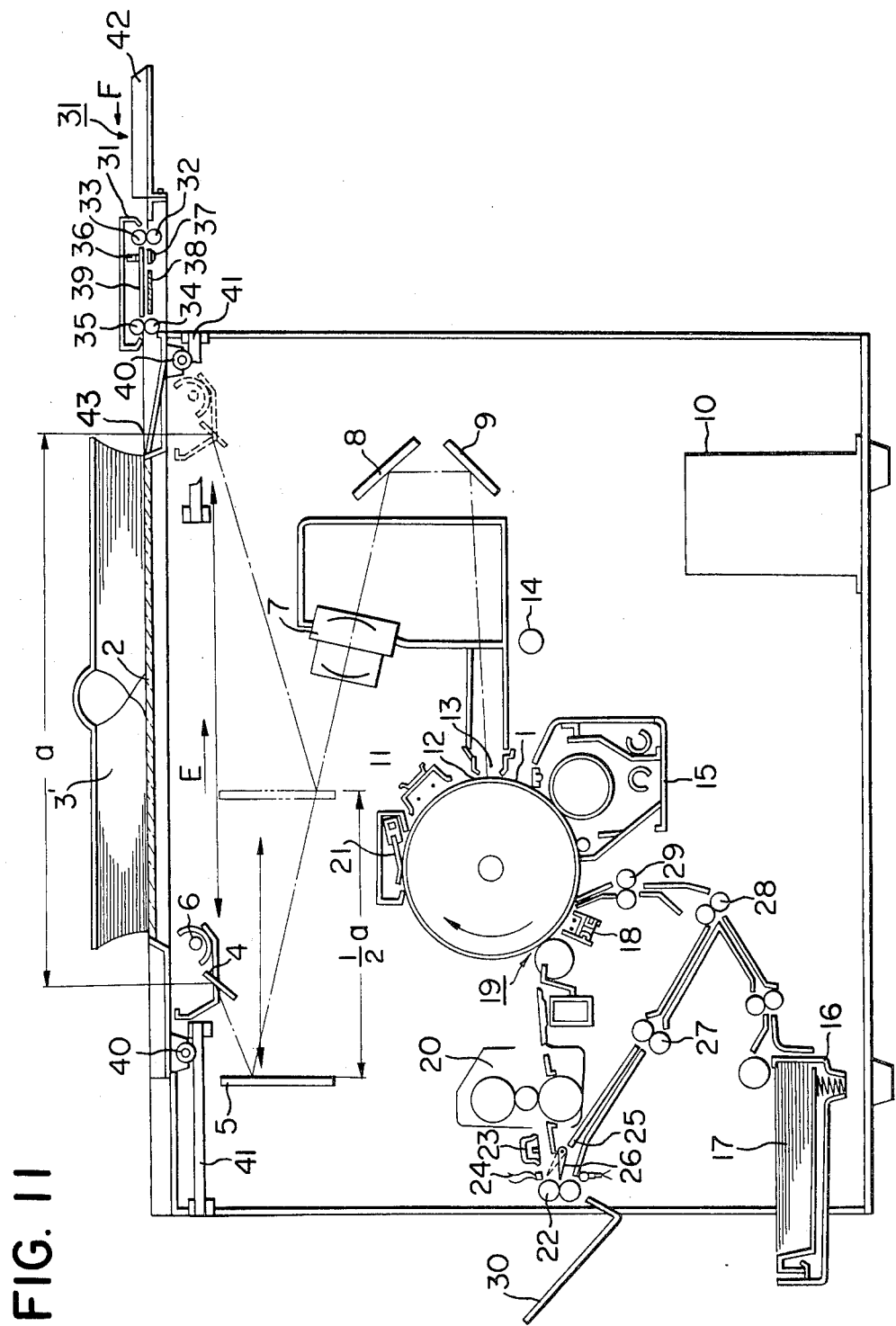
FIG. 11 is a longitudinal cross-section schematically showing a third embodiment of the present invention.

In FIG. 11, a sheet-original transport portion chiefly comprising sheet-original transport rollers 32, 33, 34, 35 is provided at the right end of an original carriage 31, and the entire carriage is displaced from the position shown in FIG. 11 where the original carriage is used as stationary one for thick-original copying to the sheet-original copying position shown in FIG. 12. At this time, the illuminating portion is displaced to just underlie the sheet-original transport portion. The original carriage 31 is provided with a wheel 40 and readily movable to left and right in FIG. 11 by manual operation, and can be locked at said two positions.

A sheet original may be fed from an original-reception guide 42 into the nip between the rollers 32 and 33 and the leading end of the sheet original may be detected by a lamp 36 and a light-sensing element 37, whereupon the sheet original will temporarily be stopped. When the drum 1 has been rotated to a predetermined angular position, the sheet original will again be transported between guide glass 38 and guide plate 39 by the rollers 32, 33, 34, 35 in synchronism with the drum 1, so that the image of the sheet original may be focused upon the drum 1, whereafter the sheet original may be discharged onto an original tray 43. When the original carriage 31 is moved to the sheet-original copying position, a gear 45 mounted on the transport roller 34 is brought into meshing engagement with a driving gear 44 on the main body, so that the transport roller 34 is driven and the transport roller 32 is driven through a belt or chain 46 and an electromagnetic clutch 47. The electromagnetic clutch 47 is controlled by a signal produced from the light-sensing element 37 and from rotation of the drum (FIG. 8).

In FIG. 11, the exposure stroke in thick-original copying mode is in the direction indicated by arrow E, and transport of sheet original occurs in the direction indicated by arrow F.

In FIG. 11, the sheet-original trasport portion is shown to be disposed at the right-hand side of the thick-original carriage glass or at the terminating end of the exposure stroke, but it may also be disposed at the left-hand side as indicated in the previous embodiment. For the following reason, however, the sheet-original transport portion should more desirably be disposed at the right-hand side.

Figure 13:
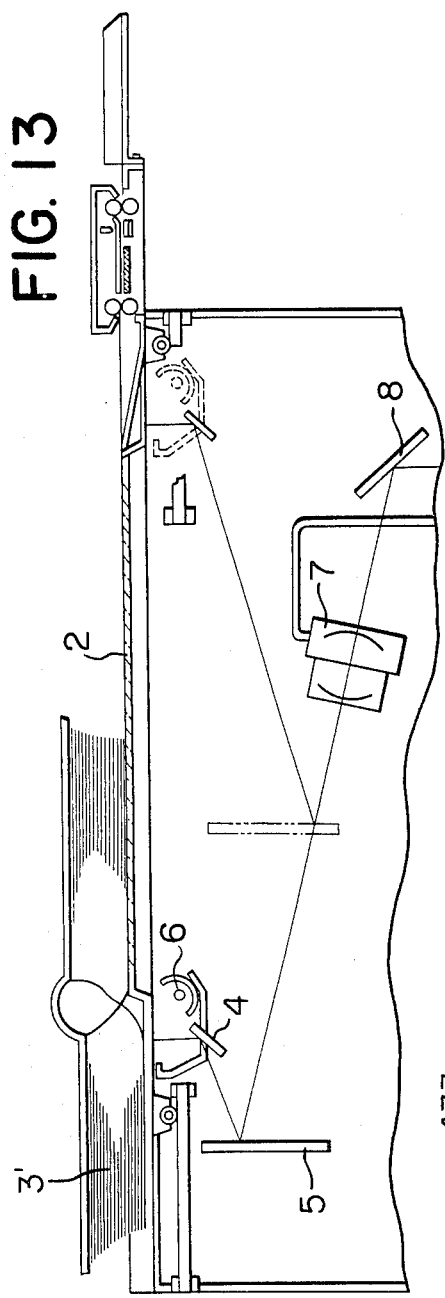
FIG. 13 is a fragmentary sectional view for illustrating the optical system during thick-original copying.

If the sheet-original transport portion was disposed at the left-hand side, it would form an obstacle in placing a thick original 3' in the manner as shown in FIG. 13, in view of the fact that the right end of the original carriage glass provides a reference position for aligning the leading end of the original. Also, the sheet reception guide disposed on the original carriage glass must be removed during thick-original copying.

FIG. 9 is again applicable to the present embodiment, and shows a case where a most common sheet-original autofeeder is disposed in the sheet-original exposure and transport portion. When a pile of sheet originals 50 is placed on a sheet-original supporting bed 51, the uppermost sheet original 50' may be fed to the sheet-original transport portion by separating and feeding rollers 54 and 55 which are rotating in the opposite directions. Thereupon, the image of the fed sheet original 50' may be focused on the drum 1 in the same manner as in the case of ordinary sheet-original copying, whereafter the sheet original 50' may be delivered into an original tray 59 with the aid of a guide 56 and delivery rollers 57 and 58.

When the autofeeder is so employed, it should preferably be disposed toward the right-hand side instead of being disposed just above the original carriage.

In order that the distance of movement required for the change-over between the two functions may be reduced by disposing the sheet-original transport portion at the right-hand side or at the terminating end of the exposure stroke, it is desirable for the sheet-original copying that the illuminating portion be stopped at the right end of its forward stroke (FIG. 12) or at the terminating end of the exposure stroke. Since the position at which the illuminating portion is stopped (home position) is usually selected immediately prior to the exposure stroke, the end terminating of the exposure stroke is usually the reversing point whereat the illuminating portion reverses from its forward stroke to its backward stroke, and not the stop position of the illuminating portion. Thus, setting must be made such that when the original carriage has been moved to the sheet-original copying position, the electric circuit is changed over to cause the illuminating portion to be automatically moved to the end of the exposure stroke.

According to the present embodiment, the change-over between the two functions is effected by moving the entire original carriage, but as in the previous embodiment, it would also be possible to secure to the main body the entire original carriage including the sheet-original transport portion and move the illuminating portion to just overlie the sheet original transport portion. In such case, the illuminating portion will be displaced beyond its movement range during thick-original copying and therefore, the optical path of the optical system must be increased in length.

Accordingly, the focal length of the lens must also be increased and this will lead to a larger size not only of the lens but also of the main body itself, which is less advisable than the present embodiment.

Thus, the present embodiment is a very excellent apparatus which permits simple change-over between the two usages and which can be realized almost on the same scale as the conventional copying machines of the stationary original carriage type and conveniently permits the use of an autofeeder.

Figure 14C:
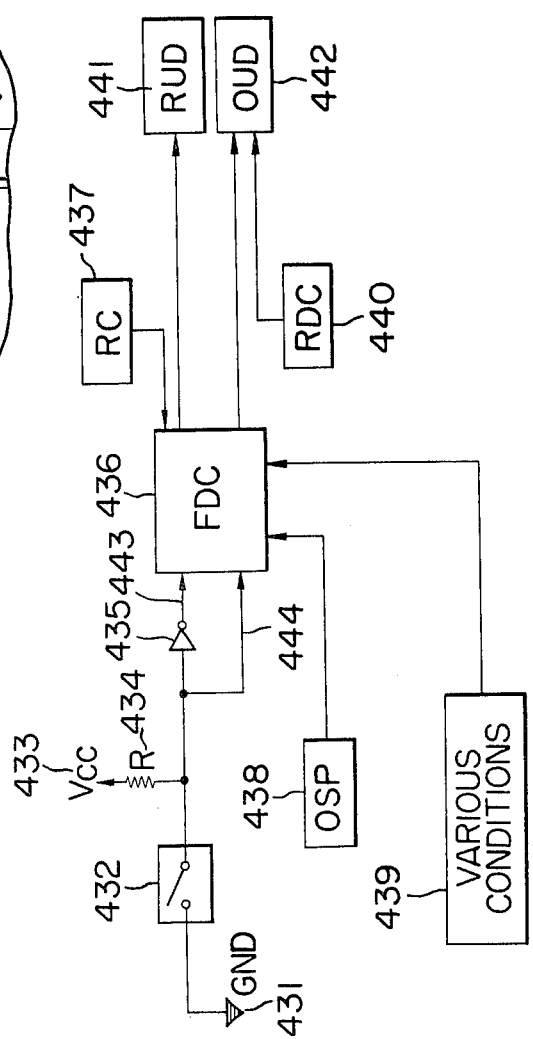
FIG. 14-a is a block diagram of a jam detecting circuit for the autofeeder.
Figures 14A, 14B:
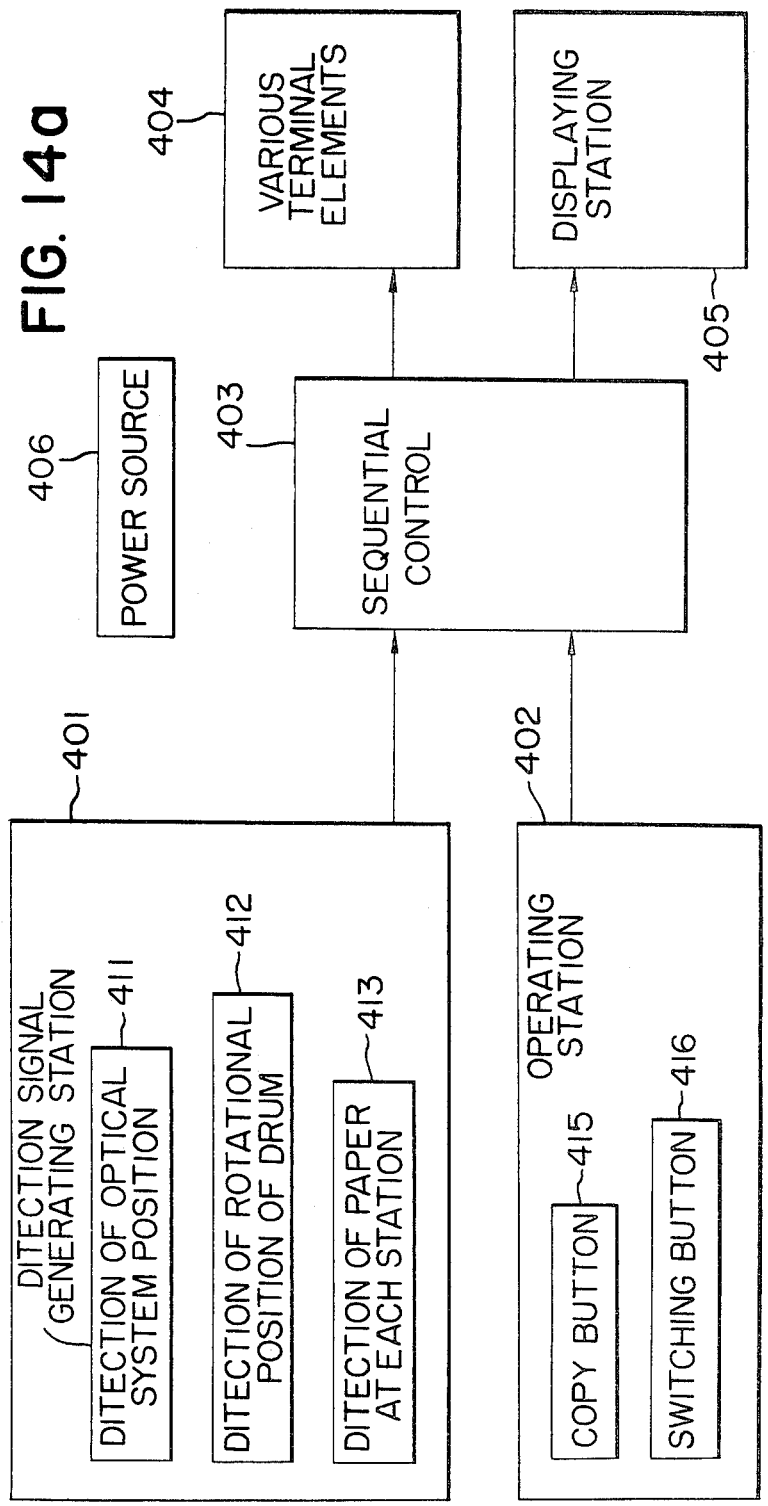

The electric control circuit in each of the above-described embodiments will now be described with reference to FIGS. 14 to 17. The electric control circuit in the present embodiment may generally be divided into the blocks as shown in FIG. 14-a. A detection signal generating station 401 includes a group of devices for generating various detection signals. Among these devices, an optical system position detecting device 411 detects various positions of the optical system, such as the home position (starting position) for thick-original copying, the paper feed position providing the timing for instructing the paper feed from the cassette, the reversing position whereat the optical system is reversed from its forward stroke to its backward stroke, and a predetermined position of the optical system during sheet-original copying. These signals are generated by a cam secured to the optical system actuating microswitches secured to stationary portions. A photosensitive drum position detecting device 412 detects rotational positions of the photosensitive drum 1 (FIG. 1). On the photosensitive surface of the drum 1, there is a seam which may not be used during latent image formation and in order that such seam may be avoided during the latent image formation, it will be useful to secure a predetermined relationship between the rotation position of the rotating drum and the exposure starting time for the original. In this connection, a reference position (home position) of the drum is defined and there is further defined a rotational position which provides the timing for exposure starting. These rotational positions are detected by the detecting device 412. More specifically, the drum may stop its rotation at the reference position, and the exposure of original may be started with the drum's predetermined rotational position detection output as the timing signal. If required, the drum position detecting device 412 may also output a rotational position detection signal which will provide a jam timing signal, but the part which pertains to the present invention will be described later. However, it should be understood that the present invention is never limited to the use of such drum synchronization system to generate various synchronizing signals from the aforesaid drum positions. Means for detecting these rotational positions are provided by a cam secured to the drum and microswitches secured to non-rotative portions. Paper detecting devices 413, which each comprises the pair of light-sensing CdS element and lamp described in connection with FIG. 1, may be provided at various necessary locations for monitoring the normal transport of copy paper, for detecting the presence of copy paper in the cassette 6 (FIG. 1), and further for controlling the transport of copy paper during both-side copying and for monitoring the transport of sheet originals. The detecting means may be not only the CdS-lamp pairs but also microswitches, although the latter need not be described in detail. The detection signal generating station 401 further includes means for automatically detecting various signals which will be necessary for the sequence control in the present embodiment of the copy apparatus, such as means for detecting the amount and density of developer, and means for detecting the temperature of heater portions which need temperature control.

An operating station 402 includes a copy button device 415 and a copy change-over device 416 which respectively include the copy buttons 103,103' and the copy button S 104, shown in FIG. 7. In the copy button device 415, when the button 103 is depressed, a thick-original copying cycle may be effected to produce a number of copies as set by the copy number set dial 106 (FIG. 7). When the button 103' is depressed, only one thick-original copy may be effected irrespective of the set number of copies. Also, when the copy button S 104 in the copying change-over device 416 is depressed, sheet-original copying mode may be obtained but the sequence thereof will further be described. The operating station 402 further includes devices which generate signals as determined by the operator of the copying apparatus, such as one-side and both-side copy selector dial, copy stop button for stopping the copying operation in the course of continuous copying, etc.

A sequence control station 403 is a circuit for generating drive instruction signals to various terminal elements in order to effect various predetermined copy cycles in accordance with the signals from the detection signal generating station 401 and the operating station 402 and the signals from preset timer means within the control station 403 itself, and not only effects the aforementioned various sequence controls but also functions to effect jam detection and generate various display instruction signals. In the present embodiment, the sequence control station chiefly uses a digital IC forming a binary logic circuit. The sequence control station 403 may functionally be subdivided into an optical system movement (forward, backward, stoppage) control portion, a main drive motor control portion, a sheet-original transport control portion, a control portion for various illuminating elements and heater elements, a high voltage source control portion, a jam discrimination and treating portion, etc., but it is not essentially different from the control circuit in conventional copying machine, excepting for the thick-original and sheet-original copy change-over control portion and the sheet-original autofeeder control portion.

Various terminal elements 404 include a high voltage source, various drive motors such as main drive motor, fan motor and developer pump drive motor, original illuminating lamp, fixing device heaters, various electromagnetic clutches, plunger, counter and other electric terminal elements. These elements may be supplied with current in accordance with the drive instruction signals from the sequence control portion 403 and perform respective operations or functions.

A displaying station 405 effects various displays useful to the operator, such as display of thick-original or sheet-original copying, display of one-side or both-side copying, display of replenishment of consumption materials such as developer, copy paper, etc., display of jam, display of the number of copies being produced. These displays are effected in accordance with the display instruction signals from the sequence control station 403, or directly in accordance with the signals from the detection signal generating station 401 and the operating station 402. A power source station 406 includes main switch, circuit breaker, door switch and power source transformer voltage stabilizing circuit, and supplies necessary AC or DC power to the various other stations.

The copying processes are controlled by the above-described control circuit. The control of the change-over between thick-original copying and sheet-original copying, which is a feature of the present invention, will now be described in detail. In FIG. 14-c, switch 432 corresponds to the copy button 104 (FIG. 7) in the above-described copy change-over device 416. In the first and second embodiments of the present invention, this switch is provided in the operating station 402, and in the third embodiment, it comprises a microswitch which is actuated by the thick-original supporting surface (original carriage) when the latter is moved to a predetermined position for sheet-original copying. Again in the third embodiment, the button S 104 may be provided in the operating station so that actuation of this button may automatically move the original carriage to said predetermined position. One terminal of the switch 432 is connected to the ground GND 431 and given a predetermined potential which will provide logic 0 in the binary logic circuit. The other terminal of the switch 432 is connected to power source Vcc 433 through resistor R 434 and also to the circuit of forward movement control portion FDC 436 directly through signal line 444, and further through inverter 435 and through signal line 443. Vcc 433 is a potential which provides logic 1 and therefore, when the switch 432 is open, logic 1 from signal line 444 and logic 0 from signal line 443 will be applied to FDC 436. When the switch 432 is short-circuited, logic 1 and logic 0 will be applied to FDC 436 from signal lines 443 and 444, respectively. Thus, during thick-original copying, the switch 432 is opened and signal lines 443 and 444 apply logic 0 and logic 1, whereby the forward movement control portion FDC 436 recognizes it. The actual means therefor is omitted herein, but at this time, FDC 436 further receives as input the aforementioned exposure start timing signal OSP from the exposure start timing signal generator 438 included in the drum position detecting device 412, and also receives, from the device group 439 shown collectively for convenience, various information signals relating to various conditions, such as whether the copy buttons 103,103' are depressed or whether various consumption materials are present or not, and then may output a forward movement instruction to the optical system driving portion OUD 442 including a magnetic clutch which can transmit the drive of the main drive motor to move the optical system. Also applied as input to OUD 442 is an optical system backward movement signal from an optical system backward movement instruction signal generating system RDC by an optical system reverse position signal from the optical system position detector 411. Next, the change-over to sheet original copying may be recognized by FDC 436 because signal lines 443 and 444 respectively provide logic 1 and logic 0 when the copy button S 104 (FIG. 7) in the first and second embodiments is depressed or the switch 432 in the third embodiment is short-circuited upon movement of the original carriage to its predetermined position. Thereupon, in the second and third embodiments, FDC 436 outputs to OUD 442 a signal for instructing the optical system to move to its predetermined position in sheet-original copying mode, and as soon as the optical system comes to stop at such predetermined position, a predetermined position detection signal is applied to FDC 436 from the various condition signal generator group 439. When the various conditions are satisfied as in thick-original copying, FDC 436 outputs a drive instruction to a sheet-original transport roller drive RUD 441 including the drive source for sheet-original transport rollers 32–35 (FIG. 2). When a sheet original is transported in the direction of arrow F (FIG. 2) by the rollers 32 and 33 and detected by a paper detector RC 437 including the CdS-lamp pair 74 (FIG. 2), the rollers 32 and 33 are temporarily stopped from rotating, whereafter they resume rotation in synchronism with the rotating photosensitive drum in response to signal OSP from device 438, thus transporting the sheet original again. However, the initial running distance of the optical system during thick-original copying is usually longer than the initial running distance during sheet-original copying, namely, the distance from the leading end of the sheet original in the temporal stop position of the rollers 32,33 to the exposure position, and therefore, in order to ensure the latent image formed on the photosensitive drum to have its forward end likewise positioned both during thick-original copying and sheet-original copying, the timing at which the rollers 32,33 resume their rotations during sheet-original copying may be obtained by delaying the signal OSP for a time corresponding to the difference in the initial running distance.

Further, in the drum synchronization system employed in the present embodiment, it is possible to enhance the time efficiency in the sheet-original copying as compared with the thick-original copying, because the backward stroke of the optical system is unnecessary during the sheet-original copying. This may be realized by a method whereby two or more complete rotations of the drum makes a thick-original copying cycle while one complete rotation of the drum makes a sheet-original copying cycle, or a method whereby one complete rotation of the drum makes a thick-original copying cycle while one-half or less rotation of the drum makes a sheet-original copying cycle. The present embodiment adopts any of these methods in accordance with the copy size. The sequence will now be considered with respect to the case where one-half rotation of the drum makes a sheet-original copying cycle. This may be accomplished by generating the signals as shown in the time chart of FIG. 14-b with rotation of the drum. More specifically, drum home position signal DHP(A) 421, which provides the reference position, is generated, whereafter there is generated signal OSP(A) 422 which provides exposure timing signal. After the drum has made one-half rotation from the reference position, signal DHP(B) 423 is again generated and, when the drum has made another one-half rotation after the generation of OSP(A) 422, signal OSP(B) 424 is now generated. In the present embodiment, the photosensitive drum 1 can stop only when it has come to the reference position at the termination of copying, namely, when DHP(A) 421 has been generated. Signal DHP(A) also provides a copy preparation start timing signal as for turn-on of illuminating device prior to the initiation of exposure, whereas signal DHP(B) may be treated as a signal which is equivalent to signal DHP(A) except that DHP(B) has no function of stopping the drum during sheet-original copying, whereby one complete rotation of the drum can make two copying cycles. Exposure start timing signals are also generated as OSP(A) 422 and OSP(A) 424 corresponding to the reference position signals DHP(A) 421 and DHP(B) 423, respectively. Thus, in this instance, sheet-original copying may be effected at a speed twice that of thick-original copying.

While the electric control system which directly pertains to the present invention has been described above, control circuits for the other portions than the sheet-original autofeeder which has only partly been described are similar to those already put into practice in conventional copying machines and form no part of the present invention and therefore, they need not be described herein.

Detailed description will now be made of an electric control circuit, particularly a jam detecting circuit, in an original autofeeder which may be added to the present embodiment.

Figure 15:
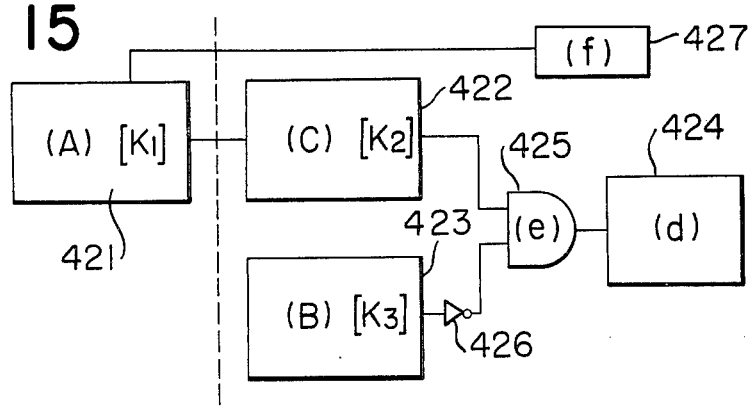
FIG. 15 is a block diagram of a jam detecting circuit.

Referring to the block diagram of FIG. 15, the circuit comprises a paper detecting circuit (A) 421 within the main body of the copying apparatus disposed in the sheet-original inlet portion and included in the detection signal generating portion 401 (FIG. 14), a delay circuit (C) 422 within the autofeeder, a paper detecting circuit (B) 423, and a jam driving circuit (d) 424. First, the paper detecting circuit (A) within the main body of the copying apparatus detects a sheet original and generates a pulse signal, which is delayed for a predetermined time by the delay circuit and applied as logic 1 to one input terminal of AND circuit (e) 425. The lamp 219 and light-sensing elements 200 (see FIG. 18) included in the paper detecting circuit (A) 421 are located at the entrance to the sheet original transport path, while the lamp and light-sensing element included in the paper detecting circuit (B) 423 within the autofeeder and located at the exit of the sheet original transport path and the signal generated thereby is passed through an inverter 426 and applied as logic 0 to the other input terminal of the AND circuit. Therein, the signal from the paper detector circuit (A) 421 is delayed by the delay circuit for a time slightly longer than the time for the sheet original to be transported from the point of time whereat it is detected by the paper detecting circuit (A) 421 until it is detected by the paper detecting circuit (B) 423. When the sheet original reaches the paper detecting circuit (B) 423 at the exit of the paper transport path within the set delay time after the sheet original has been detected by the paper detecting circuit (A) 421 at the entrance to the transport path, neither of the input terminals in the AND circuit 425 provide logic 1 and accordingly, the output terminal thereof does not provide logic 1. On the other hand, when the sheet original is delayed beyond the set delay time, both input terminals of the circuit 425 provide logic 1 and accordingly the output thereof provides logic 1, whereby a signal is delivered to the jam driving circuits 424, whereupon the jam detecting circuit can effect a predetermined necessary operation such as stoppage of various drive systems during jamming of sheet original.

Figure 16:
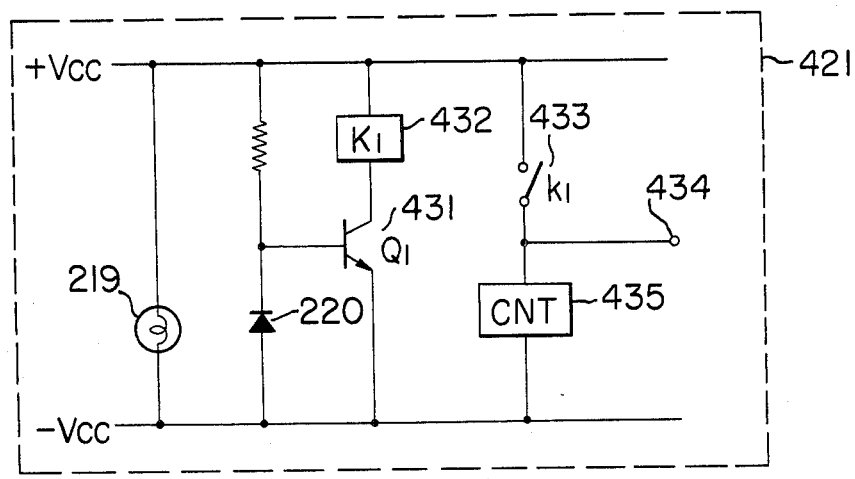
FIG. 16 diagrammatically shows a paper detecting circuit.
Figure 17:
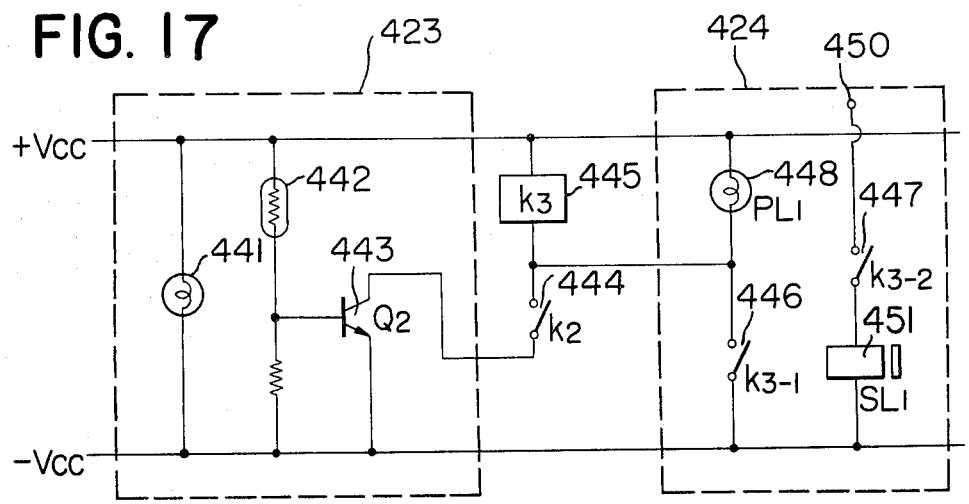
FIG. 17 diagrammatically shows a jam detecting circuit.

FIGS. 16 and 17 show specific examples of the paper detecting circuits (A) 421 and (B) 423, AND circuit 425 and jam driving circuit 424 in FIG. 15. The portion which has been described above with respect to the binary logic circuit comprises a combination of switching operations of elements which will hereinafter be described. In the paper detecting circuit (A) 421 of FIG. 16, direct detection of a sheet original is effected by the lamp 219 and light-sensing element 220 and when a sheet of paper is present between the lamp 219 and the light-sensing element 220, the base potential of npn transistor Q1 431 is increased and this transistor is turned on to permit a current flow to the excitation coil 432 of relay K1, so that the contact $k_1$ 433 thereof is closed to permit a current flow to counter means 435 while the voltage across the terminal 434 is varied from $-Vcc$ to $+Vcc$, which voltage provides a signal applied to the delay circuit. When no paper is present between the lamp 219 and the light-sensing element 220, the transistor Q1 431 is in OFF state due to the photoelectromotive force of the element 220 and the relay K1 432 is also in OFF state. In FIG. 17, paper detection in the paper detecting circuit 423 and jam driving circuit 424 within the autofeeder is performed by a lamp 441 and light-sensing element 442. When no paper is present between the lamp 441 and the CdS element 442, the resistance value of the CdS element is so low that npn transistor Q2 443 is in ON state, and when the contact $k_2$ 444 of relay K2 in the delay circuit (not shown) has been closed, namely, when jam has occurred, a current flows to the excitation coil 445 of relay K3 to energize this relay with the contact $k_{3-1}$ thereof closed, so that the relay K3 self-holds while the jam lamp 448 is turned on. Also, by another contact $k_{3-2}$ 447 of the relay K3, a plunger SL1 451 controlling the sheet original transport rollers 52–55 (see FIG. 18) within the autofeeder is deenergized to stop these rollers and accordingly stop the transport of sheet original. During normal transport, even if the contact $k_2$ 444 of the relay K2 in the delay circuit is closed, paper is already present between the lamp 441 and the light-sensing CdS element 442 and the transistor Q2 443 is in OFF state, so that the relay K3 is not operated to actuate the plunger SL1 451.

With reference to FIGS. 18 to 36, description will now be made of the sheet-original autofeeder for use with the present invention and other copying machines. An example of the copying apparatus to which the autofeeder is applicable will first be explained.

Figure 18:
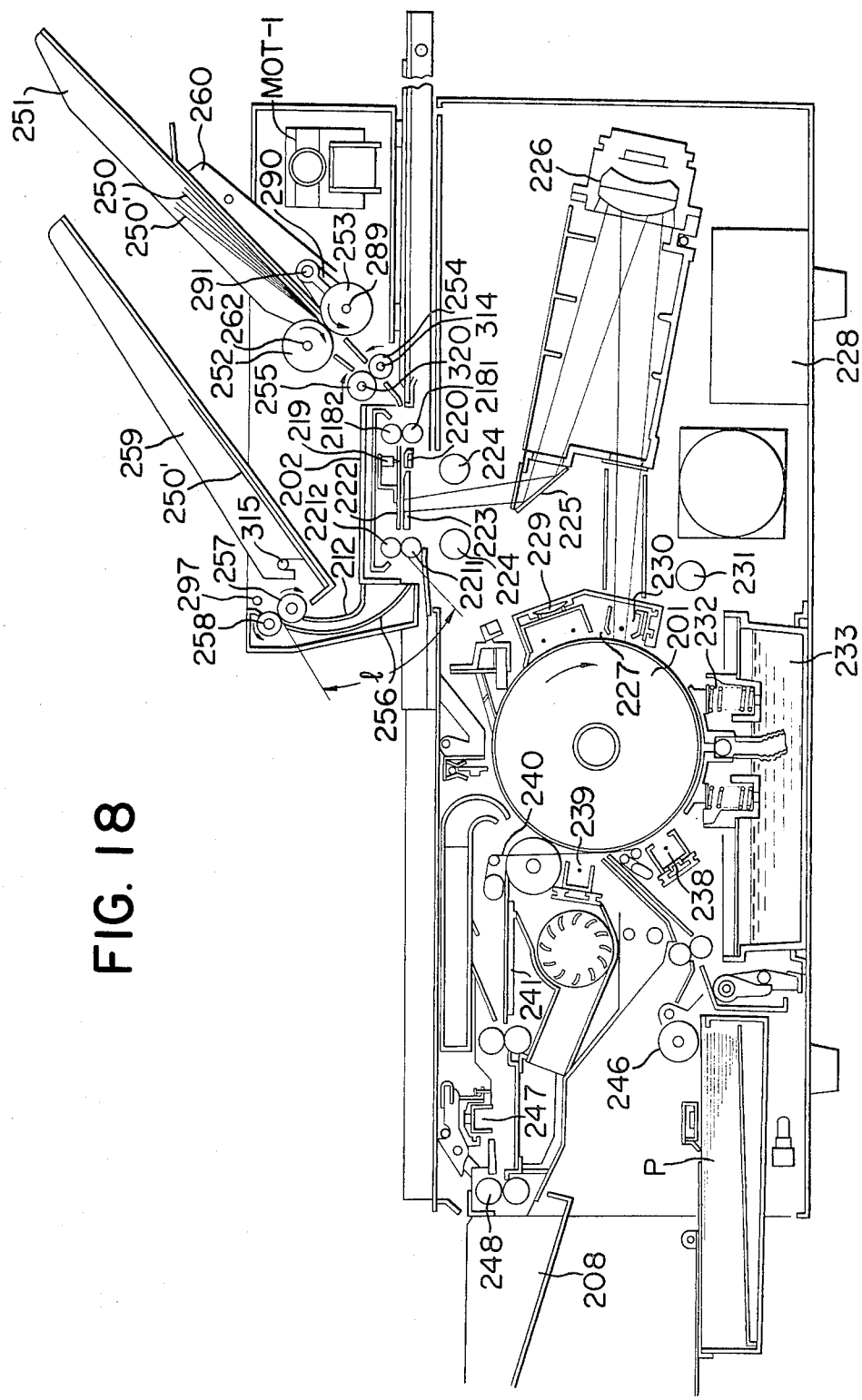
FIG. 18 is a longitudinal cross-section of a copying apparatus in which an autofeeder is applied.
Figure 19:
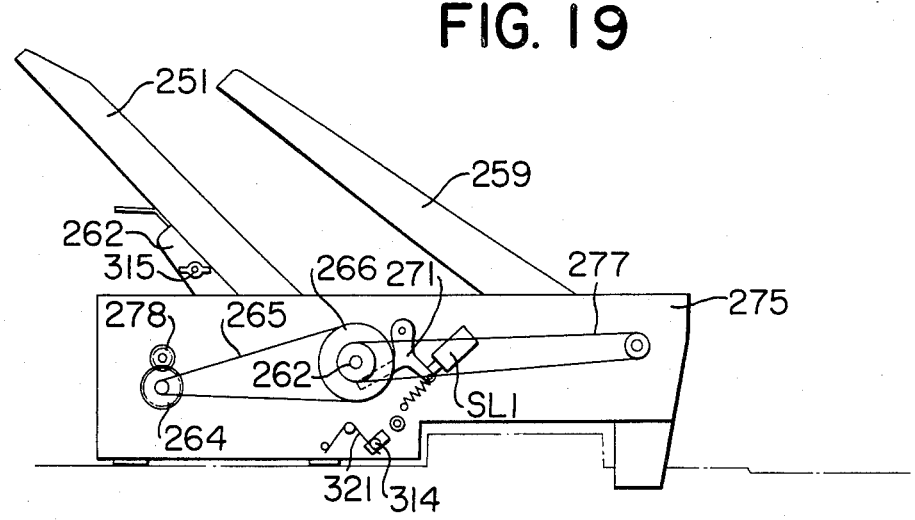
FIGS. 19 and 20 are fragmentary sectional views of the autofeeder.
Figure 21:
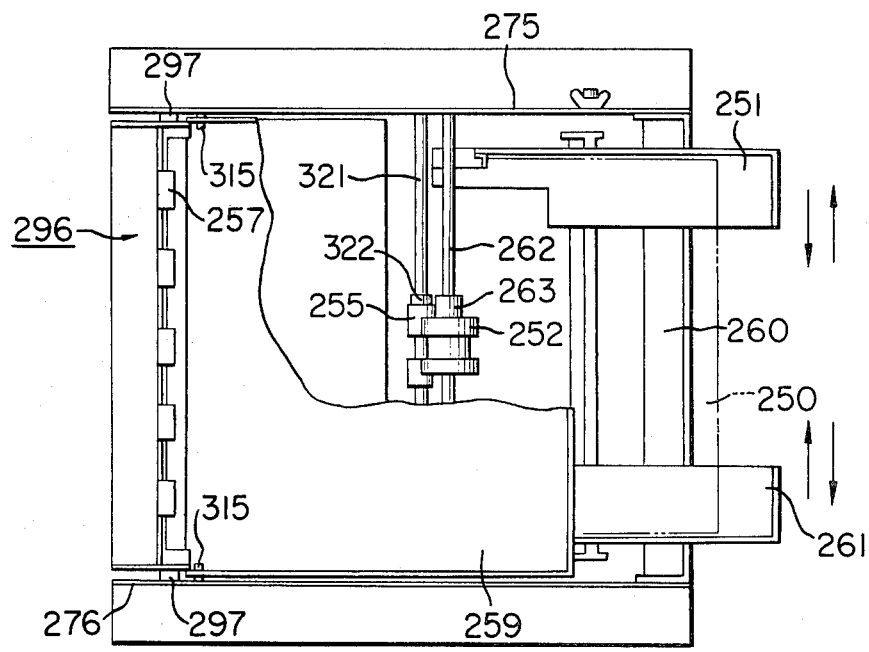
FIG. 21 is a front view of the autofeeder.
Figure 22:
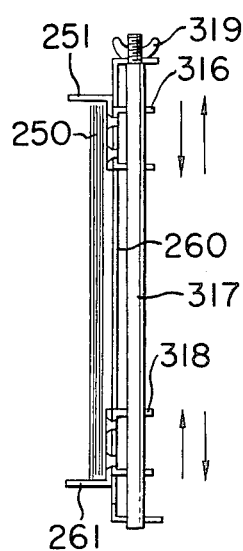
FIG. 22 is a detailed view of the inlet portion of the autofeeder.

Referring to FIGS. 18, 21 and 22, sheet holder plates 251 and 261 slidable widthwise in accordance with the size of original are provided on a sheet guide 260. Sheet originals 250 are placed on the sheet original guide 260, and the sheet holder plates 251 and 261 are slidden to match the width of the originals in order to prevent oblique displacement of the originals.

The sheet originals 250 piled on the sheet supporting bed formed by the sheet holder plates 251, 261 and the sheet guide 260 are positively separated one by one by separating and feeding rollers 252 and 253 which are rotating in the opposite directions, and continuously passed between drawing rollers 254 and 255 and into the nip between transport rollers $218_1$ and $218_2$, whereafter the leading end of a sheet original is detected by a lamp 219 and a light-sensing element 220 and thereupon, the sheet original is temporarily stopped. When the photosensitive drum 201 has rotated to a predetermined angular position, the sheet original is again transported in synchronism with the drum 201 by transport rollers $218_1$, $218_2$, $221_1$, $221_2$ and between guide glass 223 and guide plate 222, and subjected to slit-exposure, whereafter the sheet original is passed between discharge rollers 257 and 258 for discharge into an original tray 259. The rate of transport of the drawing rollers 254,255 is higher than that of the transport roller 252, so that a spacing is provided between the trailing end of a first sheet original 250' positively separated and fed by the separating and feeding rollers and the leading end of a second sheet original likewise fed. By such spacing, the second sheet original is distinguished from the first one and temporarily stopped in the same manner, while being controlled in connection with the photosensitive drum 201.

As a sheet original passes over the glass plate 223 of illuminating portion 222, it is illuminated by lamp 224 and the image of the original is directed via mirror 225 and mirror lens 226 and focused on the photosensitive drum 201 in exposure portion 227.

The photosensitive drum 201 is rotating in the direction of arrow, and is initially charged with positive polarity by primary charger 229 supplied with a high voltage from high voltage source 228. Subsequently, the photosensitive drum is slit-exposed to the original image in the exposure station 227 while, at the same time, it is subjected to AC discharge by 230 supplied with high AC voltage from the voltage source 228, whereafter it is subjected to allover exposure process by lamp 231, whereby an electrostatic latent image is formed on the surface of the photosensitive drum.

In developing device 232, the latent image is developed into a visible image by developing liquid 233, whereafter the drum surface is subjected to corona charge imparted by a negative high voltage from post-charger 238, so that any excess developer on the drum surface is squeezed out without disturbing the image. A sheet of transfer paper P is fed from paper supply portion as by roller 246 and brought into intimate contact with the photosensitive drum 201, and subjected to corona discharge from charger 239 to transfer the image onto the transfer paper P, which is then separated from the drum 201 by separator belt 240 and directed to drying-fixing portion 241.

The transfer paper P is heated and fixed by the fixing portion 241 and any residual charge on the surface of the transfer paper is removed by deelectrifier 247, whereafter the transfer paper is discharged by discharge rollers through discharge port and onto tray 208.

Figure 23:
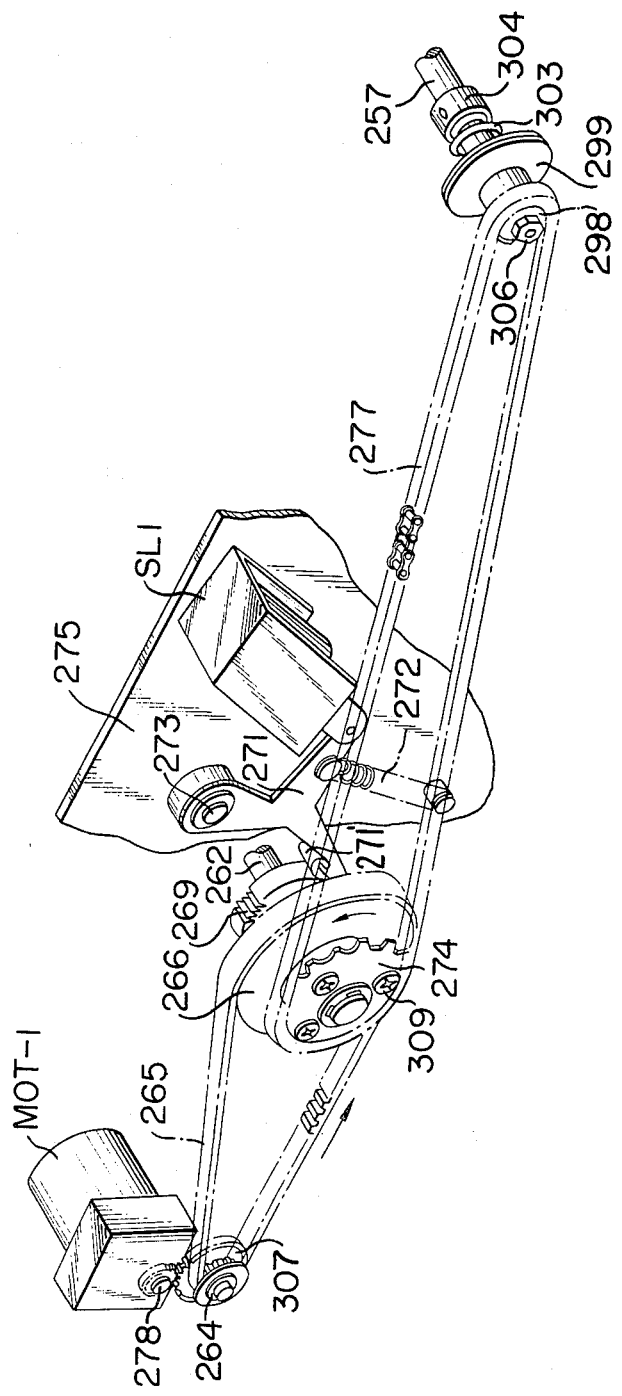
FIGS. 23 and 24 are perspective views of the driving system for the autofeeder.

Thus, the present embodiment is a combination of an electrophotographic copying apparatus and an original autofeeder. In FIG. 23, the autofeeder accommodates therein a drive motor MOT-1 which is independent of the main body of the copying apparatus. The drive of the motor is transmitted through gears 278, 307, synchro belt-wheel 264 and synchro belt 265 to drive synchro belt-wheel 266. The synchro belt-wheel 266 is made integral with sprocket wheel 274 by screws 309 and drives sprocket wheel 298 which is mounted so as to rotate discharge roller 257. The integral assembly of the synchro belt-wheel 266 and the sprocket 274 is additionally provided with a flange 267 and further integrated by screws 309, and freely rotatable on shaft 262 with bearing 279 interposed therebetween. Brake lever 271 is rotatable about shaft 273 secured to side plate 275 and is biased by spring 272 so that brake lever contact portion 271' is urged against ratchet 269. When plunger SL1 is energized for attraction, the brake lever contact portion 271' may be disengaged from the ratchet 269.

Figure 25:
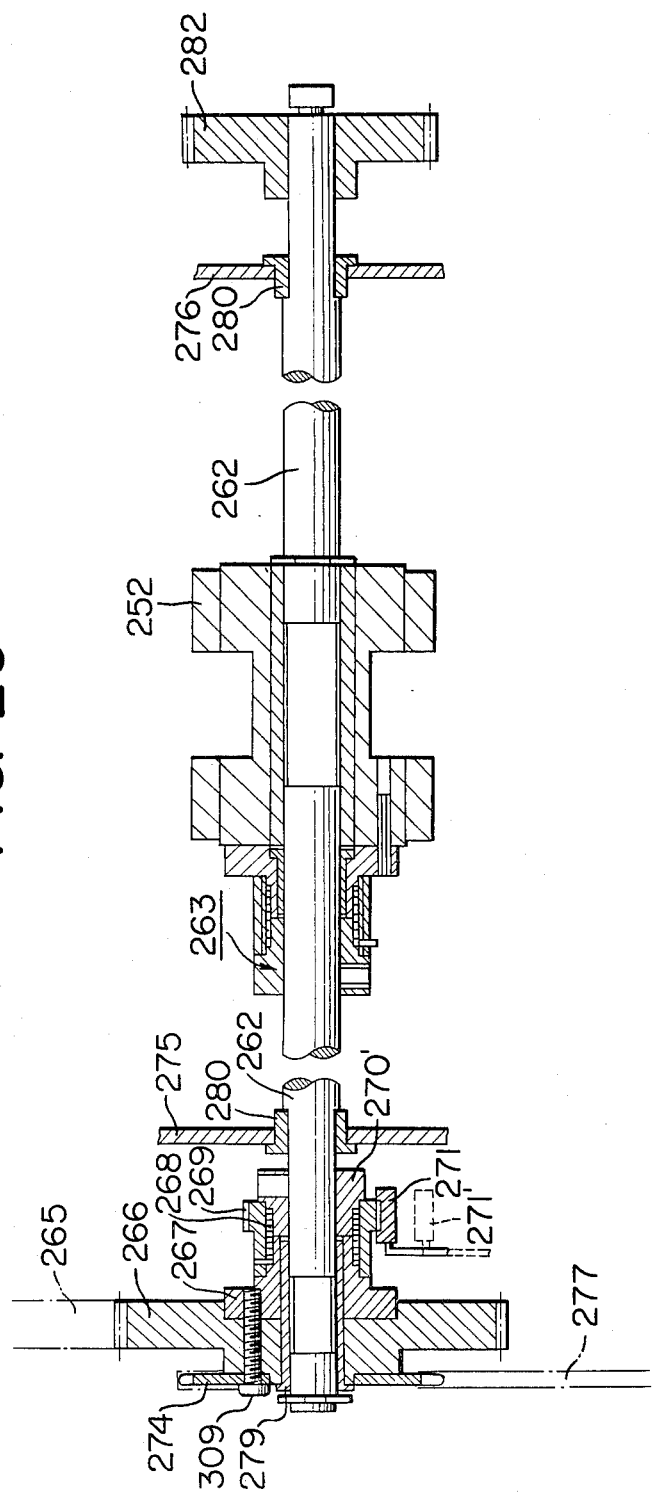
FIG. 25 is a sectional view of the driving system.
Figure 26:
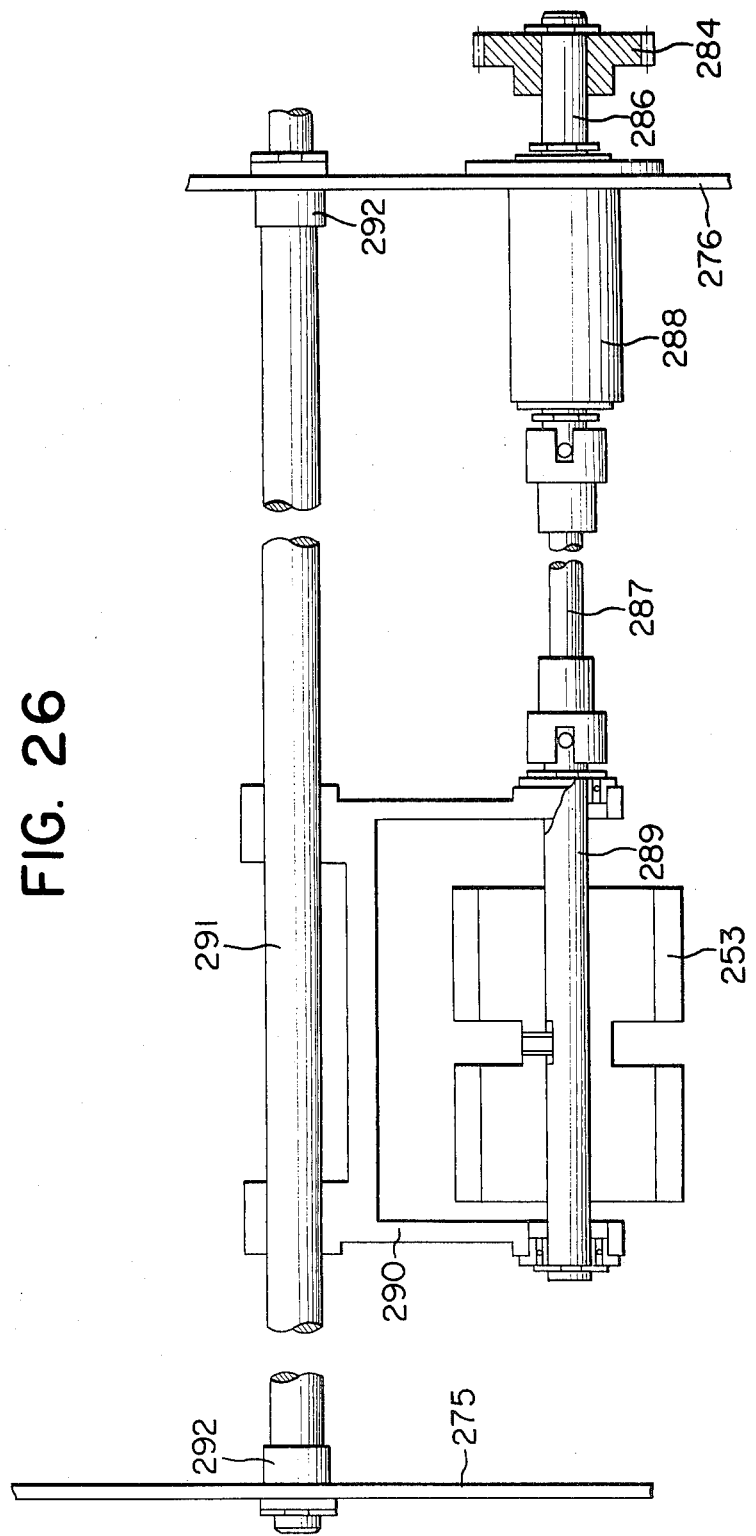
FIG. 26 is a sectional view of the separating roller in the driving system.

In FIG. 25, when the brake contact portion 271' is in engagement with the ratchet 269, clutch spring 268 does not transmit the rotational movement of the sprocket flange 267 to the shaft 262. When the brake contact portion 271' is disengaged from the ratchet 269, clutch spring 268 may act to transmit the rotational movement to the shaft 262. In other words, when the plunger SL1 is energized for attraction, the shaft 262 is rotated and when the plunger SL1 is deenergized, the shaft 262 is not rotated. The shaft 262 drives transport roller 252 through overrunning clutch 263.

When the autofeeder is connected to the main body of the copying apparatus by means of connector, the drive motor MOT-1 revolves but the plunger SL1 is not energized yet. When copy button is depressed, the plunger SL1 is energized to bring the brake contact portion 271' out of engagement with the ratchet 269 to permit rotation of the feed roller 252, which thus feeds a sheet original 250 into the nip between transport rollers $218_1$ and $218_2$, and when the leading end of the sheet original is detected by the lamp 219 and light-sensing element 220, the clutch in the original feeding portion of the main body is stopped. Simultaneously therewith, the plunger SL1 is deenergized and the feed roller 252 is temporarily stopped from rotating. (As will later be described, the drawing rollers 254, 255 and the separating roller 253 are also in synchronism with the feed roller 252.) When the photosensitive drum 201 has been rotated to a predetermined angular position, the clutch in the original transport portion is operated to drive transport rollers $218_1$, $218_2$, $221_1$, $221_2$. In synchronism therewith, the plunger SL1 is energized for attraction and the feed roller 252 is rotated to feed a second sheet original.

Figure 20:
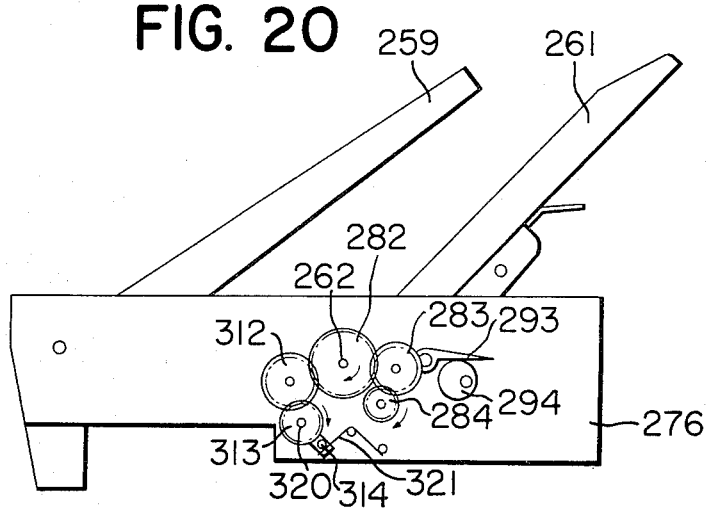
Figure 24:
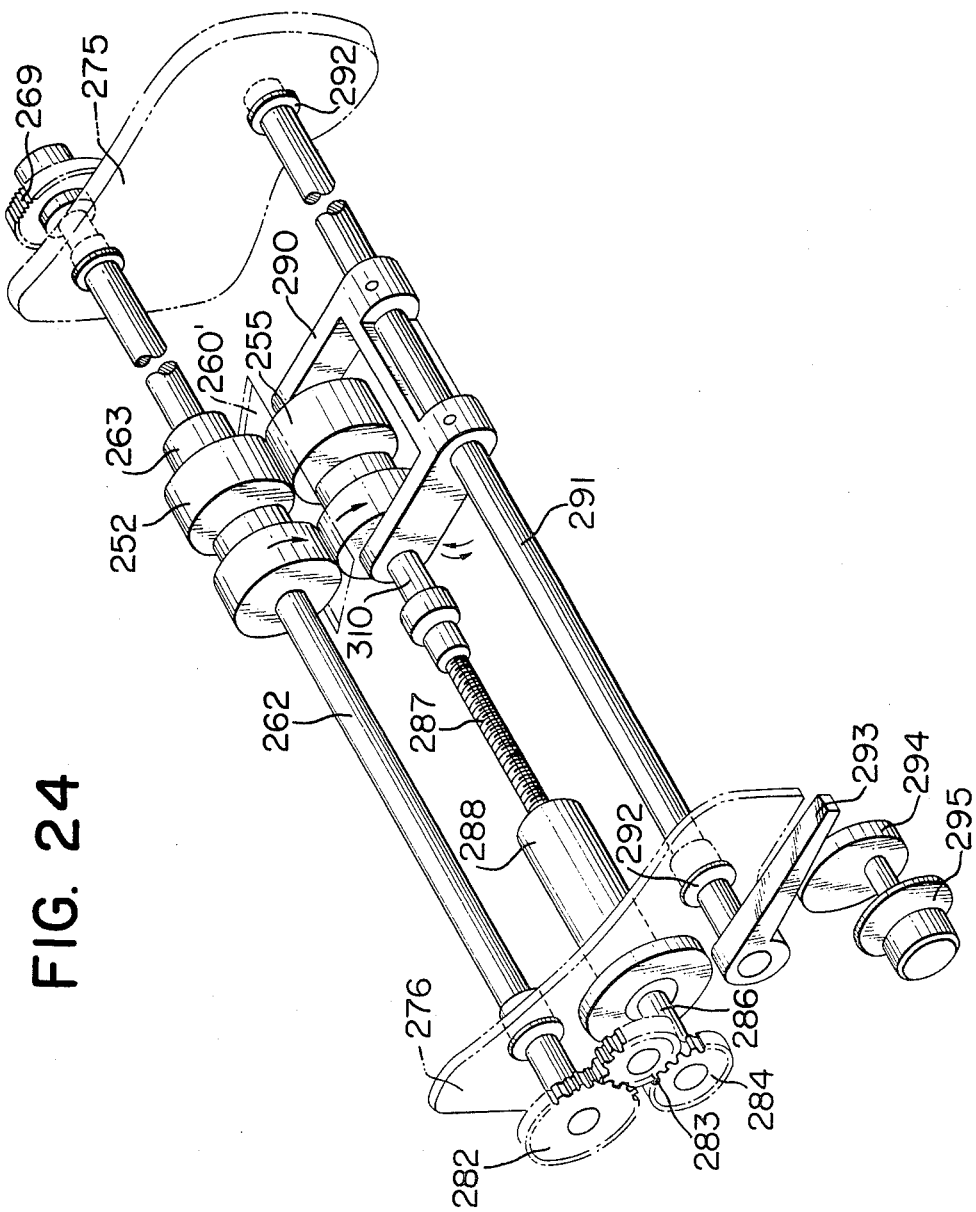

The shaft 262, as shown in FIG. 24, drives gears 282, 283 and 284, which in turn drive shaft 286 supported by bearing box 288. The shaft 286 is connected to the shaft 289 of the separating roller 253 by means of universal joint 287 and transmits rotational movement in the opposite direction to the direction of rotation of the feed roller 252. The shaft 262 further drives the drawing rollers 254 and 255 via gears 312, 313 and shaft 314 (FIGS. 18 and 20).

Shaft 291 is supported by bearings 292 secured to the opposite side plates 276 and 275. Fork 290 supporting arm 293 and separating roller 253 is secured to the shaft 291, and the fork 290 and separating roller 253 may be vertically moved by rotation of eccentric cam 294 in accordance with the thickness of sheet originals. This is useful to prevent a plurality of sheet originals from being fed at a time (FIG. 24). In FIG. 24, shaft 262 drives drawing roller shaft 320 through the agency of gears 282, 312, 313. Further, shaft 320 drives drawing roller 255 through the agency of overrunning clutch 322. Driven drawing roller 254 is urged into contact with driving drawing roller 255 by torsion spring 321 secured to the opposite side plates by means of shaft 314.

Referring to FIG. 27, sprocket 298 is made integral with friction plate 299 by pins 311 and rotatable on discharge roller 257 by means of bearing 305.

On the friction plate 299, friction pad 300 is held by spring 303 with immovable friction plate 301 and spring receiver 302 interposed between the pad and the spring.

Rotational force of sprocket 298 may be increased or decreased by adjusting the frictional force by means of stop 304 and nut 306 and transmitted to discharge roller 257 to adjust the transport power of the discharge roller to a level lower than that of transport rollers $221_1$ and $221_2$.

In FIG. 28, the peripheral speed of discharge rollers 257 and 258 is somewhat higher than that of sheet transport rollers $218_1$, $218_2$, $221_2$, $221_2$ (synchronized with the drum 201) in order to prevent a sheet original 250 from slackening between second guides 256 and 212, and when the leading end of the exposed sheet original has come into the nip between the discharge rollers, these discharge rollers slip with the aid of the friction pad 300 and friction plate 299 to reduce their peripheral speed down to a level equal to that of transport rollers $221_1$ and $221_2$.

When the trailing end of the sheet original has left the nip between the transport rollers $221_1$ and $221_2$, the sheet original assumes a speed equal to the peripheral speed of the discharge rollers. The second guide 256 may be opened and closed by pivoting about shaft 297 and can be locked in its open position. The present embodiment can feed and transport paper of up to size A5, but in FIG. 18, if the paper size is smaller than the inter-axis distance 1 between the transport rollers $221_1$, $221_2$ and the discharge rollers 257, 258, then the second guide 256 may be opened clockwisely as shown in FIG. 28, to thereby permit sheet originals to be discharged forwardly. This also holds true when originals are formed of cardboard.

In FIGS. 18, 21 and 22, sheet holder plates 261 and 252 are slidable on stay 317 secured to sheet guide 260 by butterfly nut 319, with the aid of holder plate guides 316 and 318. The sheet holder plates 261 and 252 may easily be disassembled by removing the butterfly nut 319 and the stay 317, and the discharge tray 259 may simply be removed because it is only hooked on dowels 315. Thus, the sheet holder plates 251, 261 and the discharge tray 259 may all be disassembled with ease and this means compactness and convenience for shipping.

Another embodiment of the autofeeder will now be described. This embodiment is a combination of a sheet-original transport portion of a sheet-original and book-original copying apparatus with an original separating and feeding portion and a discharge portion.

Figure 29:
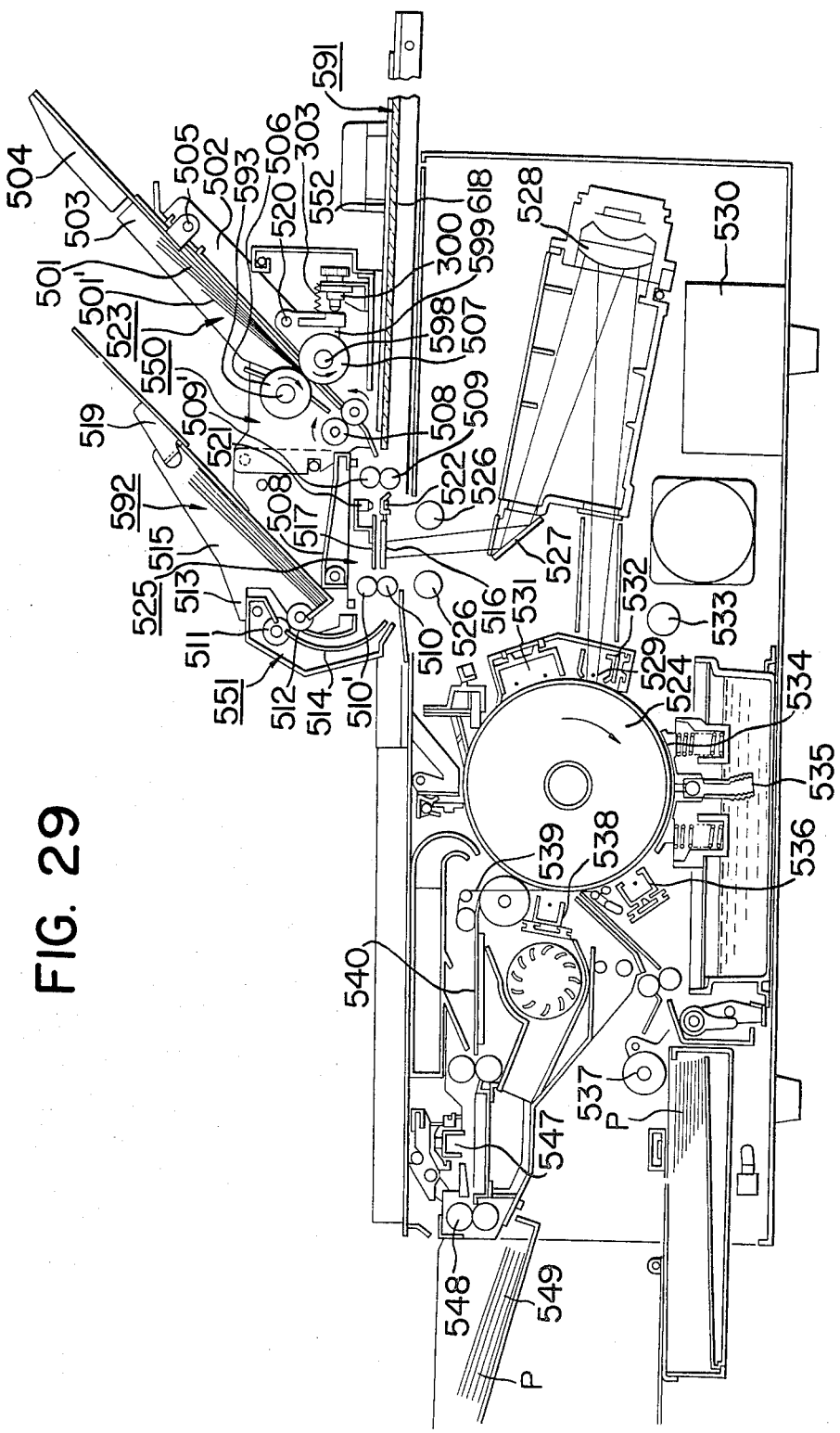
FIG. 29 is a longitudinal cross-section of a sheet-original and thick-original copying apparatus with an autofeeder equipped with a separating and transporting portion and a discharge portion.

Operation of such embodiment will be described in connection with FIG. 29.

A pile of originals 501 is placed on original-supporting bed 523 in such a manner that the surfaces of the originals to be copied face downwardly and the page number progresses from the lowermost sheet to the uppermost. The uppermost sheet original, which corresponds to the last page, is separated and transported by separating roller 507 and transport roller 506 which are rotating in the opposite directions, and continuously passed between drawing rollers 508 and into the nip between transport rollers 509 contained within original carriage 591. The leading end of the sheet original is detected by lamp 521 and light-sensing element 522, whereupon the sheet original is temporarily stopped. When photosensitive drum 524 has rotated to a predetermined angular position, the sheet original is again transported in synchronism with the drum 524 by transport rollers 509 and 510 and between guide glass 516 and guide plate 517, and undergoes slit-exposure. Thereafter, the sheet original is passed between discharge rollers 511 and 512 for discharge into original tray 592 while effecting a U-turn. The transport rate of the drawings rollers 508 is higher than that of the transport rollers 506 so that a spacing is provided between the trailing end of the first sheet original 501' and the leading end of the second sheet original continuously and positively separated and fed by the separating-feeding roller. By such spacing, the second sheet original is distinguished from the first one and temporarily stopped in the same manner, and controlled in connection with the photosensitive drum 524.

As a sheet original passes over the glass plate 516 of illuminating portion 525, it is illuminated by lamp 526 and the image of the original is directed via mirror 527 and mirror lens 528 and focused on the photosensitive drum 524 in exposure portion 529. The photosensitive drum 524 is rotating in the direction of arrow, and is initially charged with positive polarity by primary charger 531 supplied with a high voltage from high voltage source 530. Subsequently, the photosensitive drum is slit-exposed to the original image in the exposure portion 529 while, at the same time, it is subjected to AC discharge by discharger 532 supplied with high AC voltage from the voltage source 530, whereafter it is subjected to allover exposure process by lamp 533, whereby an electrostatic latent image is formed on the surface of the photosensitive drum. In developing device 534, the latent image is developed into a visible image by developing liquid 535, whereafter the drum surface is subjected to corona charge imparted by a negative high voltage from post-charger 536, so that any excess developer on the drum surface is squeezed out without disturbing the image. A sheet of transfer paper P is fed from paper supply portion as by roller 537 and brought into intimate contact with the photosensitive drum, and separated therefrom by separator belt 539 and directed into drying-fixing portion 540. The transfer paper P is heated and fixed by the fixing portion 540 and any residual charges on the surface of the transfer paper are removed by deelectrifier 547, whereafter the transfer paper is discharged by discharge rollers 548 through discharge port and onto tray 549. The discharged transfer paper P lies with its image-bearing surface facing upwardly, and sheets of transfer paper so discharged in succession are piled in such a manner that the transfer sheet correspond to the last page of the originals lies at bottom. When all the sheet originals so piled have been copied, both the sheet originals and the sheets of transfer paper are piled in the same order of pages as when the sheet originals were initially piled on the original-supporting bed 523, thus eliminating the loss of time which would otherwise involved in re-arranging the sheets in order of pages.

Figure 30:
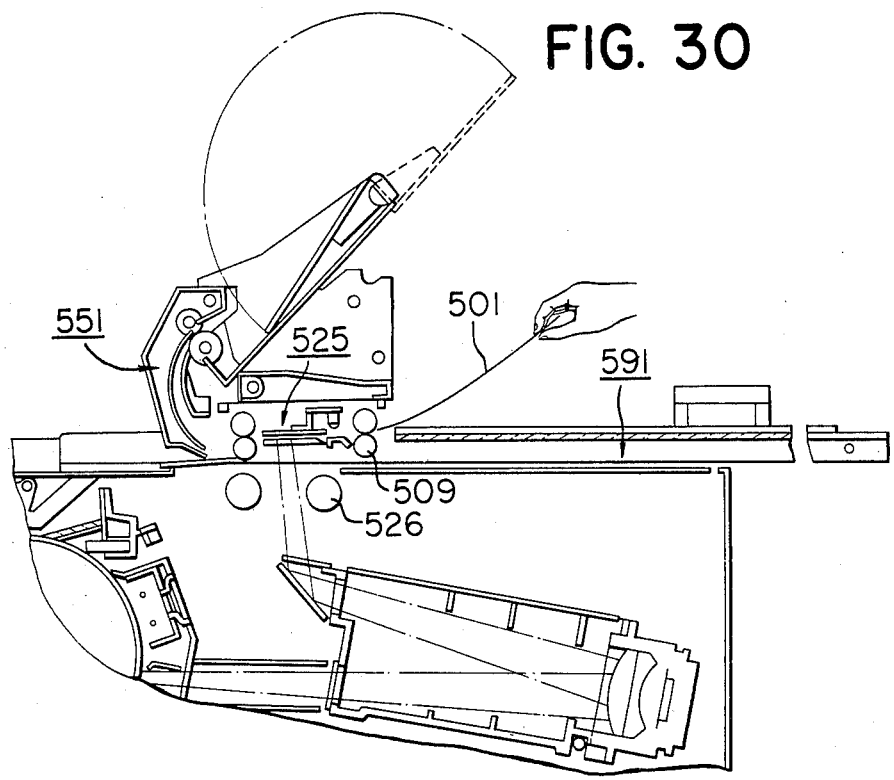
FIG. 30 is a fragmentary sectional view of the copying apparatus with the separating and transporting portion released.
Figure 31:
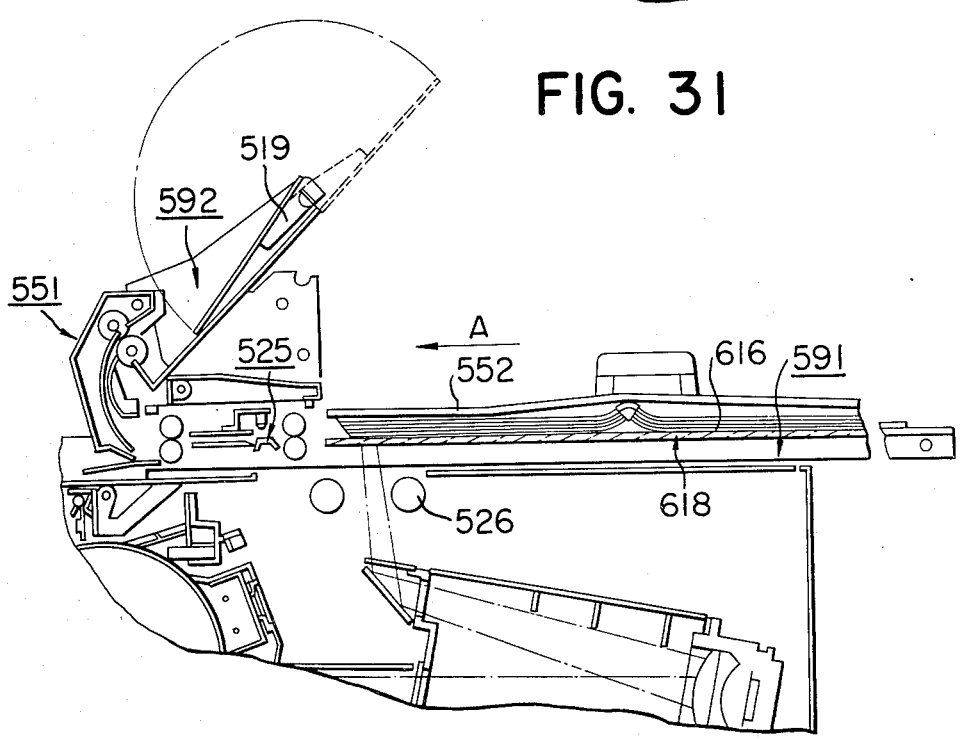
FIG. 31 is a fragmentary sectional view of the copying apparatus when changed over to the thick-original copying mode.

A further feature of the present invention is that, as shown in FIG. 30, the original separating and feeding portion is readily removable and even after it is removed, copying may be carried out by feeding a sheet original 501 into the nip between the reception rollers 509 and this may be done without hampering the function of the discharge portion. Also, with the original separating and feeding portion removed, the entire original carriage 591 may be moved to a position for thick-original copying, as shown in FIG. 31. Details of the driving system in such case are omitted for simplicity. Then, the forward end of original-supporting glass 618 just overlies the illuminating lamp 536 and when copy button is depressed, the entire original carriage 591 is driven in the direction of arrow A and a thick original 616 is illuminated by the lamp 526 for slit-exposure to be effected, whereby a copy of the thick original may be provided. When the present embodiment is thus utilized in a sheet-original and thick-original copying apparatus, copies of sheet originals may be produced simply by feeding sheet originals into the inlet of the exposure and transport portion but without the necessity of flatly spreading the originals on the original carriage, and also the thick-original carriage is readily available for use.

Figure 32:
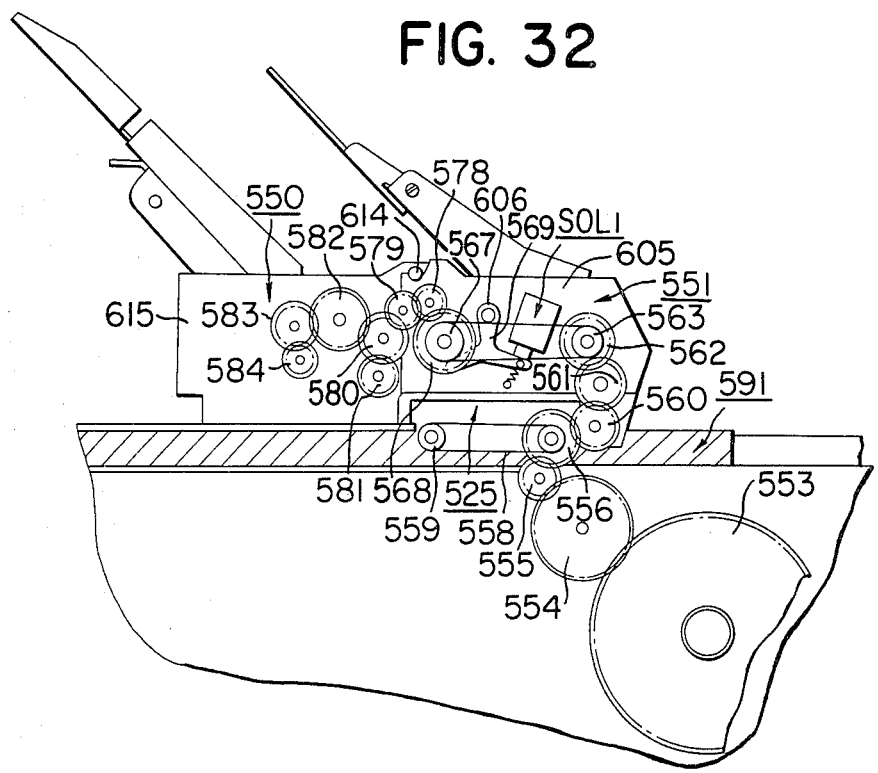
FIG. 32 is a sectional view of the driving system of the FIG. 29 autofeeder as seen from the back thereof.

With reference to FIG. 32, description will be made of the driving system when the separating and feeding portion and the discharge portion are mounted on the apparatus. Driving gear 555 in the main body synchronized with drum gear 554 is meshed by gear 556 mounted on the transport roller 510 of exposure and transport portion 525 to drive transport rollers 510 and 510', which in turn drive transport rollers 509 and 509' via belt or chain 558 and electromagnetic clutch 590.

Figure 33:
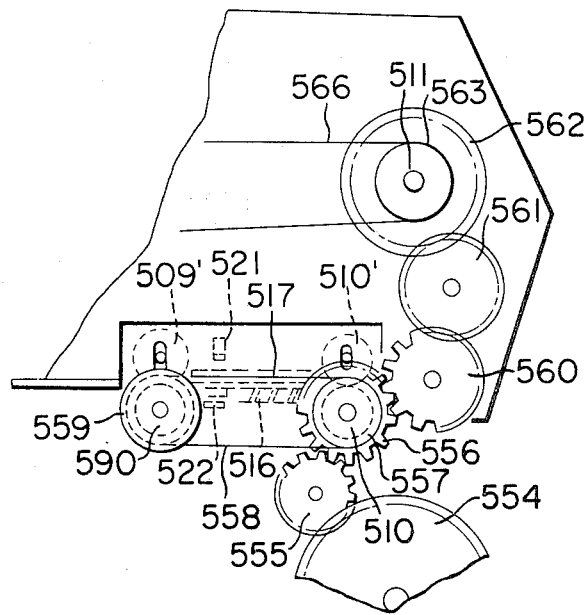
FIG. 33 is a detailed sectional view of the driving system for the transport portion.
Figure 34:
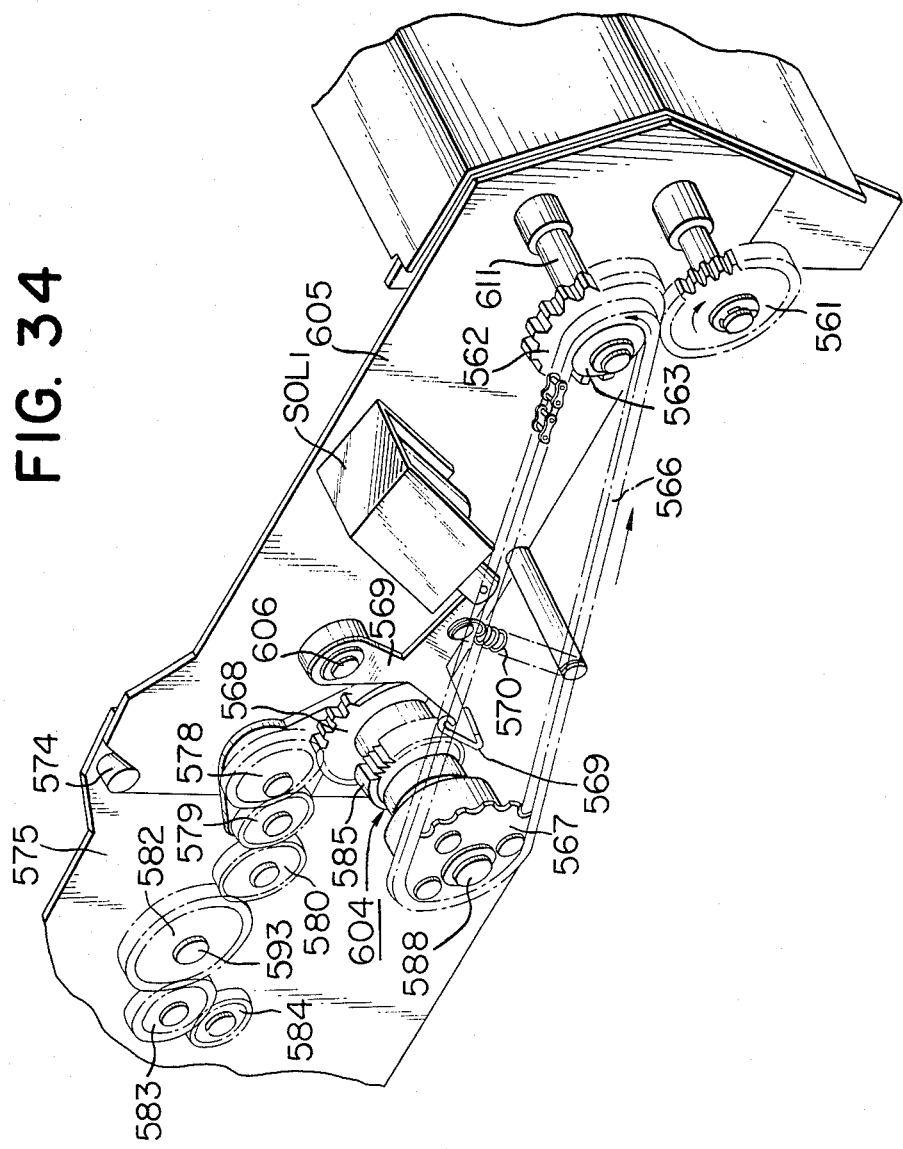
FIG. 34 is a perspective view of the driving system.
Figure 35:
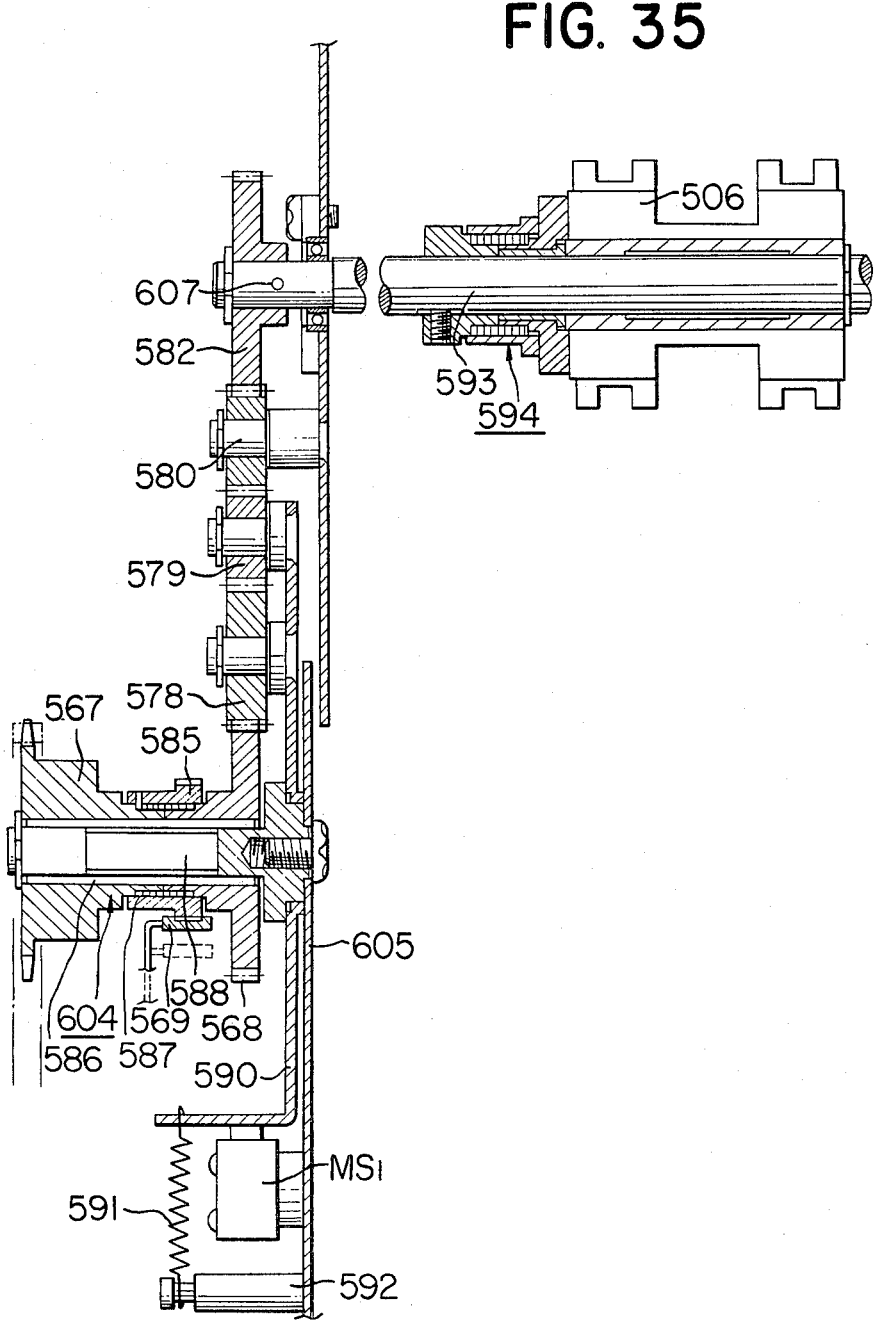
FIG. 35 is a sectional view of the clutch portion and feed roller with their driving system.

The electromagnetic clutch 590 is controlled by a signal produced from light-sensing element 522 and from rotational position of the drum (FIG. 33).

During thick-original copying, the driving gear 555 and the gear 556 may be disengaged from each other by changing over original carriage 591.

The gear 556 further transmits the drive through idler 560 to the input gear 561 of the discharge portion 551.

In FIGS. 32, 34, 35 and 36, gear 561 meshing with the gear 560 rotates sprocket 567 of clutch portion 604 through the agency of gear 562 integral with sprocket 563 and chain 566. In the clutch portion 604, bearing 586 is provided on clutch shaft 588 secured to side plate 605, and outwardly thereof, a ratchet 585 is rotated through the agency of sprocket 567, gear 568 and clutch spring 587. Brake lever 569 is rotatable about dowel 606 secured to side plate 605, but biased by spring 570 so that brake lever contact portion 569 is urged against ratchet 585.

When plunger SOL1 is energized for attraction, the brake lever contact portion 569' may be disengaged from the ratchet 585. In FIG. 32, when the brake contact portion 569' is in engagement with the ratchet 585, clutch spring 587 does not transmit the rotational movement of the sprocket 567 to the gear 568. When the brake contact portion 569' is disengaged from the ratchet 585, clutch spring 587 may act to transmit the rotational movement to the gear 568. In other words, when the plunger SOL1 is energized for attraction, the gear 568 is rotated and when the plunger is deenergized, the gear 568 is not rotated.

The gear 568 transmits the drive through idler gears 578, 579, 580 to gears 582, 583, 584.

The gear 582 is secured to shaft 593 by pin 607. The shaft 593 drives feed roller 506 through the agency of overrunning clutch 594. When copy button is depressed, the drum gear 553 begins to rotate while the plunger SOL1 is energized to bring the brake contact portion 569' out of engagement with the ratchet 585 to permit rotation of the feed roller 506, which thus feeds a sheet original 501 into the nip between transport rollers 509 and 509', and when the leading end of the sheet original is detected by the lamp 521 and light-sensing element 522, the clutch 590 in the original illuminating portion of the main body is stopped. Simultaneously therewith, the plunger SOL1 is deenergized and the feed roller 506 is temporarily stopped from rotating.

As will later be described, the drawing rollers 508, 609 and the separating roller 507 are also in synchronism with the feed roller 506. When the photosensitive drum has rotated to a predetermined angular position, the clutch in the original illuminating portion is operated to drive transport rollers 509, 510. In synchronism therewith, the plunger SOL1 is energized for attraction and the feed roller 506 is rotated to feed a second sheet original.

Further, as shown in FIG. 32, gears 581 and 584 are rotated in synchronism with gear 582. As seen in FIG. 36, the gear 581 is secured to shaft 611 by pin 613 and drives drawing rollers 508 and 609 through the agency of overrunning clutch 613 (FIGS. 32 and 36).

The gear 584 is made integral with shaft 596 and supported by bearing box 595, and transmits rotational movement in the same direction as the direction of rotation of the feed roller 506, through universal joint 597 and shaft 598. The shaft 520 supports arm 599 by means of bearings 614, the arm 599 being secured to the opposite side plates. Spring 603 is extended between arm 599 and adjusting base plate 602, so as to cause the arm 599 to abut against an adjusting steel ball 601.

By turning an adjusting knob 600, the spacing between the separating roller 507 and the feed roller 506 may be adjusted in accordance with the thickness of sheet original.

We claim:
1. A copying apparatus comprising:
an original holder having a holding surface for supporting a thick original for exposure;
sheet original transport means having at least two pairs of rollers, said apparatus further comprising an exposure station disposed between said pairs of rollers and provided independently from said original holder at a position contiguous thereto, said original holder and said sheet original transport means being integrally connected, wherein a sheet original is scanned while being fed by said transport means past said exposure station toward said thick original holding surface;
movable optical means having a scanning range for scanning an image of a thick original supported on said holding surface, said optical means being movable substantially within the scanning range, wherein said movable optical means scans the thick original while moving toward said sheet original transport means;
mode selecting means for moving said original holder between a first position wherein said exposure station of the sheet original is within said scanning range for the thick original to allow exposure operations for sheet originals substantially within said scanning range, and a second position wherein said exposure station of the sheet original is out of said scanning range;
copy processing means for producing on copy material an image of an original image scanned by said optical means;
a frame for integrally supporting said original holder and said sheet original transport means; and
a guiding member for moving said original holder and sheet original transport means together with said frame through a distance substantially corresponding to the distance between said exposure station and a contiguous end of said holder surface, wherein the scanning distance for thick originals corresponds to the length of the holder surface.

2. An apparatus according to claim 1, further comprising an original discharge tray, located between said sheet transport means and said thick original holding surface, for receiving sheet originals discharged out of said sheet original transport means.

* * * * *

UNITED STATES PATENT AND TRADEMARK OFFICE
CERTIFICATE OF CORRECTION

PATENT NO. : 4,395,118

DATED : July 26, 1983

INVENTOR(S) : SHIGEHIRO KOMORI, ET AL.

It is certified that error appears in the above-identified patent and that said Letters Patent is hereby corrected as shown below:

Column 3, line 32,33, "simple" should read --simply--.

Column 4, line 57, "on" should read --in--.

Column 11, line 48, insert --above-- after "from".

Column 12, line 5, "trasport" should read --transport--.

Column 17, line 27, "elements" should read --element--.

Column 22, line 48, "536" should read --526--.

Signed and Sealed this

Third Day of January 1984

[SEAL]

Attest:

GERALD J. MOSSINGHOFF

Attesting Officer    Commissioner of Patents and Trademarks